(12) United States Patent
Wenren et al.

(10) Patent No.: US 11,733,488 B2
(45) Date of Patent: Aug. 22, 2023

(54) OPTICAL IMAGING LENS ASSEMBLY

(71) Applicant: Zhejiang Sunny Optical Co., Ltd, Ningbo (CN)

(72) Inventors: Jianke Wenren, Ningbo (CN); Xue Gao, Ningbo (CN); Fujian Dai, Ningbo (CN); Liefeng Zhao, Ningbo (CN)

(73) Assignee: Zhejiong Sunny Optical Co., Ltd, Ningbo (CN)

( * ) Notice: Subject to any disclaimer, the term of this patent is extended or adjusted under 35 U.S.C. 154(b) by 387 days.

(21) Appl. No.: 17/021,127

(22) Filed: Sep. 15, 2020

(65) Prior Publication Data

US 2021/0080699 A1    Mar. 18, 2021

(30) Foreign Application Priority Data

Sep. 18, 2019  (CN) .......................... 201910882302.9

(51) Int. Cl.
*G02B 13/00*  (2006.01)
*G02B 9/62*  (2006.01)
*G02B 13/02*  (2006.01)
*G02B 27/00*  (2006.01)

(52) U.S. Cl.
CPC .......... *G02B 13/0045* (2013.01); *G02B 9/62* (2013.01); *G02B 13/02* (2013.01); *G02B 27/0025* (2013.01)

(58) Field of Classification Search
CPC .... H04N 5/222; H04N 5/2254; G02B 15/146; G02B 27/0025; G02B 13/0045; G02B 13/02; G02B 13/0015; G02B 9/62; G02B 9/64

USPC ................. 359/656–658, 713, 749, 756–762
See application file for complete search history.

(56) References Cited

U.S. PATENT DOCUMENTS

| 9,170,400 | B2 | 10/2015 | Huang |
| 9,857,559 | B2 | 1/2018 | Huang |
| 2016/0124194 | A1 | 5/2016 | Tsai et al. |
| 2016/0187620 | A1* | 6/2016 | Huang ............... G02B 13/0045 359/713 |
| 2018/0045914 | A1* | 2/2018 | Park, II .............. G02B 13/0045 |

OTHER PUBLICATIONS

Communication dated Jul. 22, 2021 by the Indian Patent Office in application No. 202014038772.

* cited by examiner

*Primary Examiner* — Travis S Fissel
(74) *Attorney, Agent, or Firm* — Sughru Mion, PLLC

(57) ABSTRACT

The present disclosure discloses an optical imaging lens assembly including, sequentially from an object side to an image side along an optical axis, a first lens having refractive power; a second lens having refractive power with a convex object-side surface and a concave image-side surface; a third lens having refractive power; a fourth lens having negative refractive power; a fifth lens having negative refractive power with a concave object-side surface and a convex image-side surface; and a sixth lens having refractive power with a concave object-side surface and a convex image-side surface. A distance TTL along the optical axis from an object-side surface of the first lens to an imaging plane of the optical imaging lens assembly and a total effective focal length f of the optical imaging lens assembly satisfy: TTL/f<1.

18 Claims, 11 Drawing Sheets

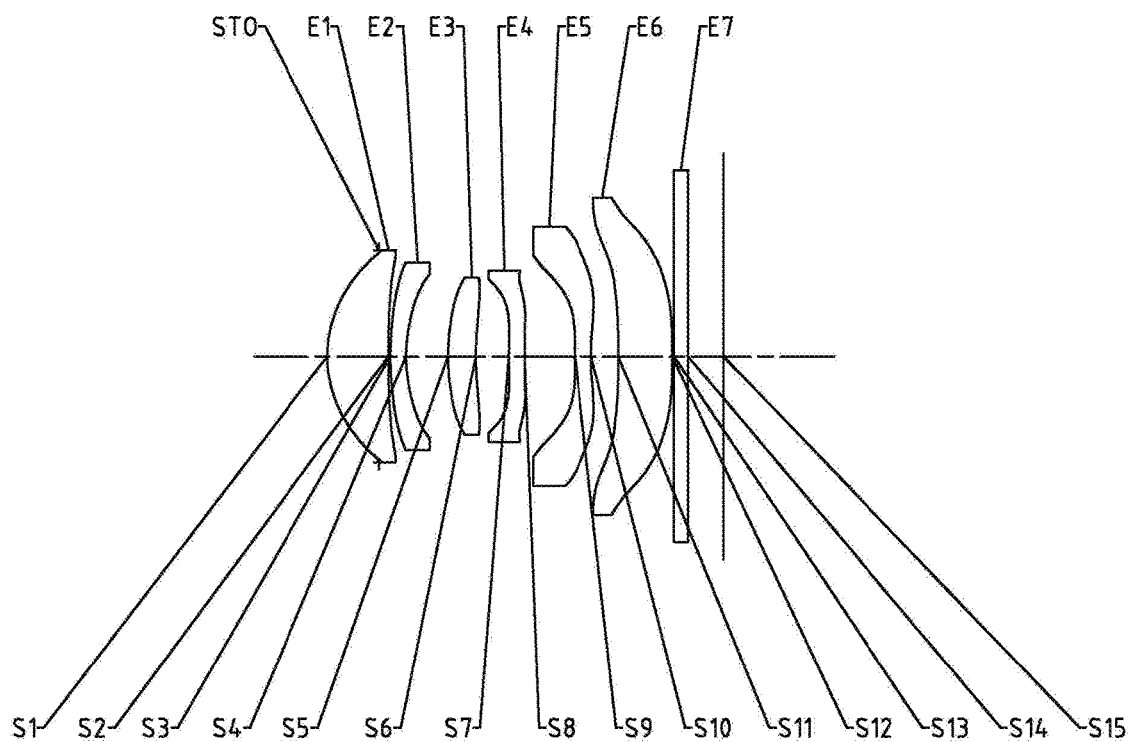
Fig. 1
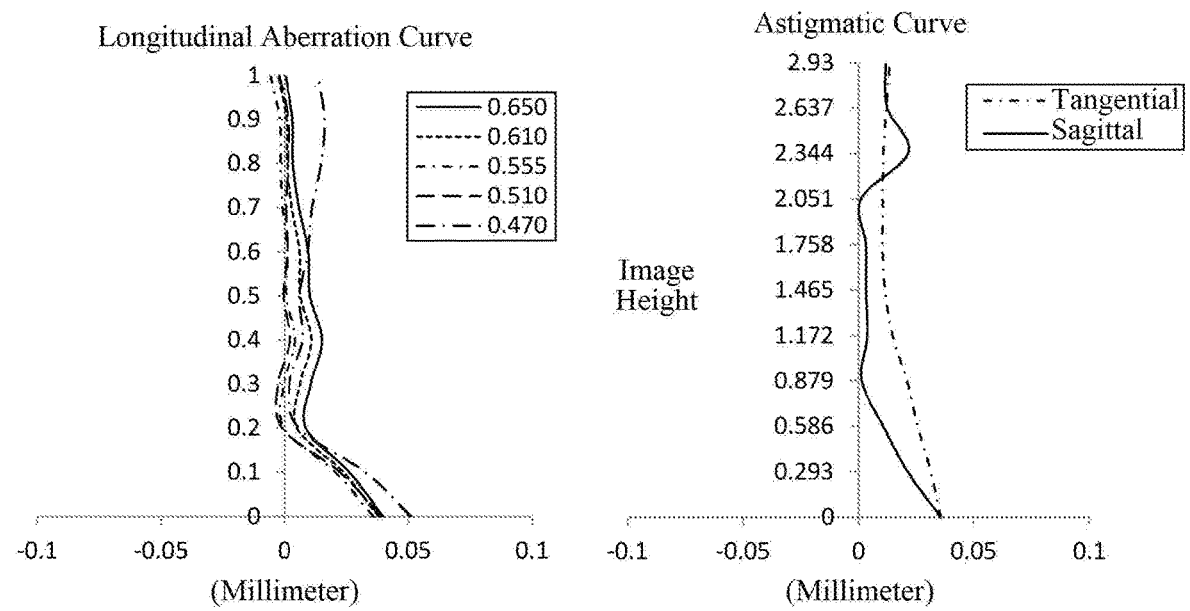
Fig. 2A
Fig. 2B

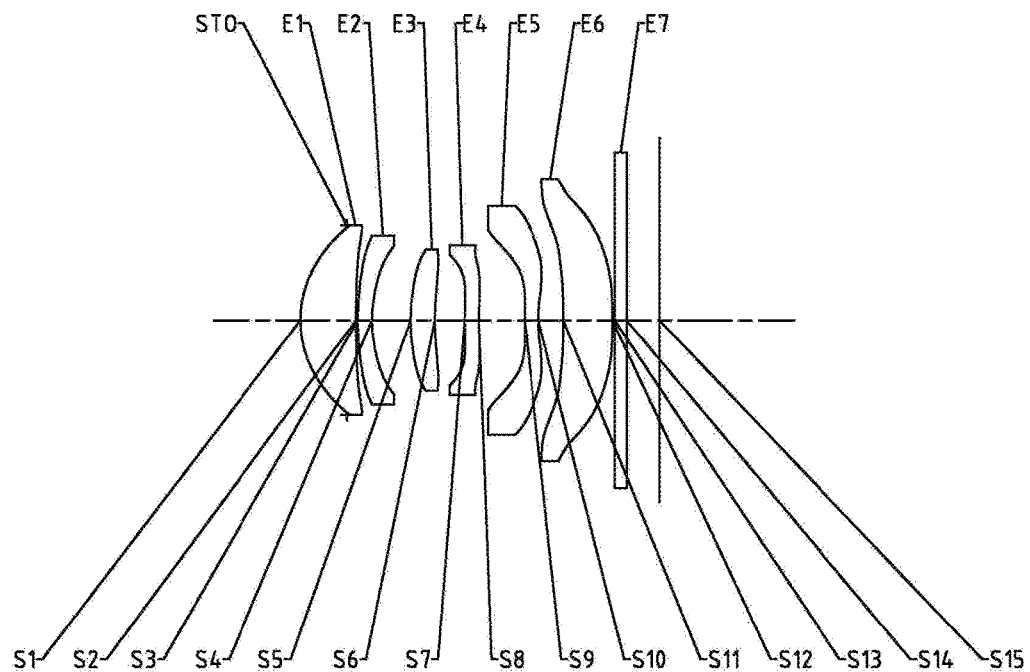
Fig. 5
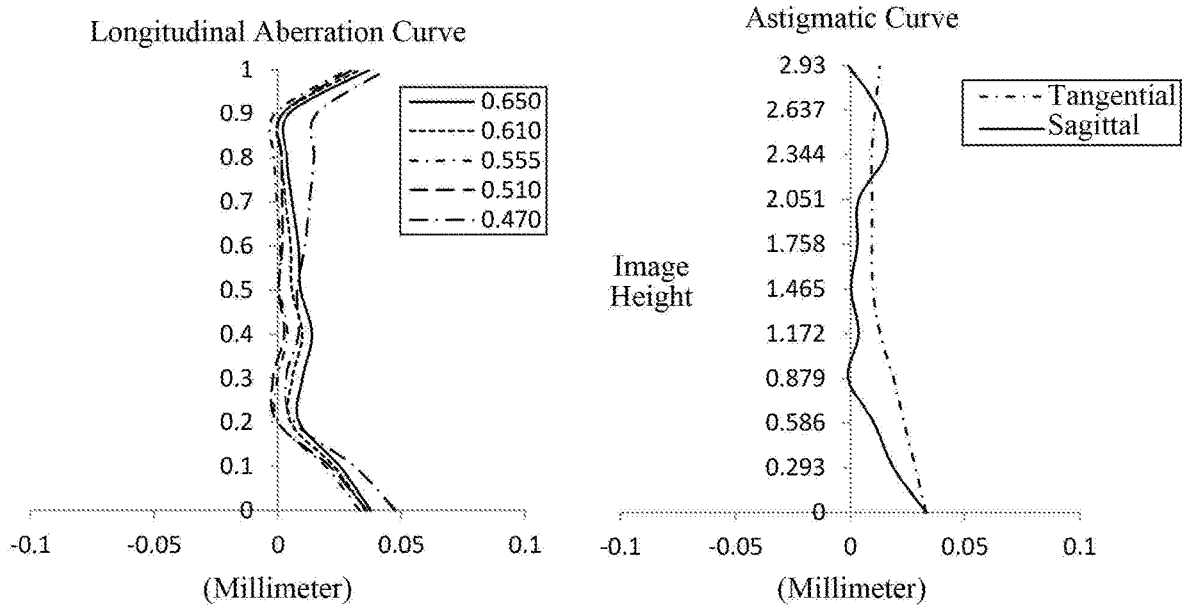
Fig. 6A
Fig. 6B

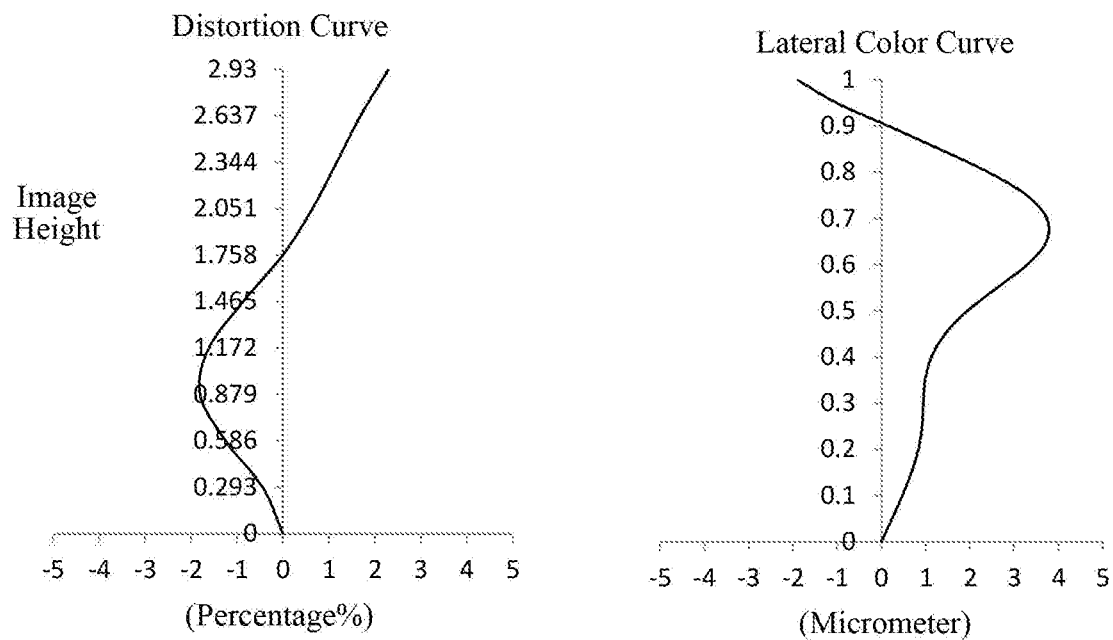
Fig. 10C
Fig. 10D
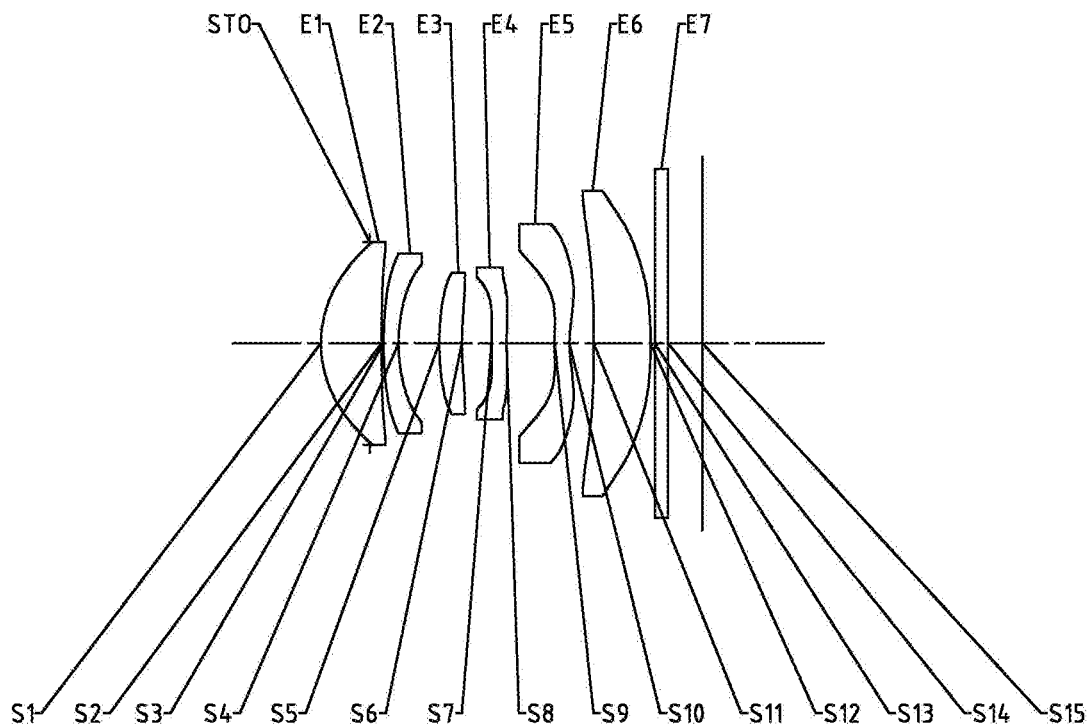
Fig. 11

OPTICAL IMAGING LENS ASSEMBLY

CROSS-REFERENCE TO RELATED APPLICATION

This application claims benefit of priority to Chinese Patent Application No. 201910882302.9 filed on Sep. 18, 2019 before the China National Intellectual Property Administration, the entire disclosure of which is incorporated herein by reference in its entity.

TECHNICAL FIELD

The present disclosure relates to the field of optical elements, and specifically, relates to an optical imaging lens assembly.

BACKGROUND

With the advancement of science and technology and the rapid development of the portable electronic product, such as mobile phone and tablet computer, people put forward higher and higher imaging requirements for the optical imaging lens assembly. As the size of the portable electronic product, such as mobile phone and tablet computer, is reduced, the optical imaging lens assembly need to be reduced in size while meeting the characteristics of high pixels and compactness.

In the previous design, it is required to reduce the number of lenses of the optical imaging lens assembly as much as possible to achieve the reduce in size of the optical imaging lens assembly. However, the increased design difficulty caused by the lack of aspheric coefficients will make the optical system difficult to meet the market's demand for high-pixel imaging performance. In the current common six-piece telephoto optical imaging lens assembly, the thicknesses of the optical lenses are large, which is not conducive to lens molding, and causes poor sensitivity of the optical imaging lens. In addition, in the case that the optical imaging lens has the same length, the large thickness of the optical lens leads to a short back focus of the optical imaging lens assembly, which makes the lens difficult to process.

SUMMARY

In one aspect, the present disclosure provides an optical imaging lens assembly which includes, sequentially from an object side to an image side along an optical axis, a first lens having refractive power; a second lens having refractive power with a convex object-side surface and a concave image-side surface; a third lens having refractive power; a fourth lens having negative refractive power; a fifth lens having negative refractive power with a concave object-side surface and a convex image-side surface; and a sixth lens having refractive power with a concave object-side surface and a convex image-side surface.

In one embodiment, a distance TTL along the optical axis from an object-side surface of the first lens to an imaging plane of the optical imaging lens assembly and a total effective focal length f of the optical imaging lens assembly may satisfy: $TTL/f<1$.

In one embodiment, a center thickness CT1 of the first lens along the optical axis, a center thickness CT2 of the second lens along the optical axis and a center thickness CT3 of the third lens along the optical axis may satisfy: $1.0<CT1/(CT2+CT3)<2.0$.

In one embodiment, a radius of curvature R3 of the object-side surface of the second lens and a radius of curvature R4 of the image-side surface of the second lens may satisfy: $3.0<(R3+R4)/(R3-R4)<3.5$.

In one embodiment, a radius of curvature R5 of an object-side surface of the third lens and a radius of curvature R6 of an image-side surface of the third lens may satisfy: $4.5<R6/R5<6.0$.

In one embodiment, a radius of curvature R7 of an object-side surface of the fourth lens and a radius of curvature R8 of an image-side surface of the fourth lens may satisfy: $1.5<R8/(R7*3)<3.0$.

In one embodiment, a radius of curvature R9 of the object-side surface of the fifth lens and a radius of curvature R10 of the image-side surface of the fifth lens may satisfy: $1.5 \leq R10/R9<2.5$.

In one embodiment, a radius of curvature R11 of the object-side surface of the sixth lens and a radius of curvature R12 of the image-side surface of the sixth lens may satisfy: $1.5<R11/R12<4.5$.

In one embodiment, a spaced interval T23 between the second lens and the third lens along the optical axis and a center thickness CT3 of the third lens along the optical axis may satisfy: $1.5 \leq T23/CT3<4.5$.

In one embodiment, a center thickness CT6 of the sixth lens along the optical axis and a spaced interval T56 between the fifth lens and the sixth lens along the optical axis may satisfy: $1.5<CT6/T56<2.5$.

In one embodiment, a radius of curvature R2 of an image-side surface of the first lens and an effective focal length f1 of the first lens may satisfy: $2.5<R2/f1<5.5$.

In one embodiment, an effective focal length f2 of the second lens and a radius of curvature R3 of the object-side surface of the second lens may satisfy: $-2.0<f2/R3<-1.0$.

In one embodiment, an effective focal length f5 of the fifth lens and a radius of curvature R9 of the object-side surface of the fifth lens may satisfy: $2.0<f5/R9<2.5$.

The present disclosure employs six lenses, and the optical imaging lens assembly has at least one beneficial effect, such as telephoto, high image quality, and suitable for production and processing and the like, by rationally configuring the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent by reading the detailed description of the non-limiting embodiments with reference to the accompanying drawings:

FIG. 1 illustrates a schematic structural view of an optical imaging lens assembly according to example 1 of the present disclosure;

FIGS. 2A to 2D illustrate a longitudinal aberration curve, an astigmatic curve, a distortion curve, and a lateral color curve of the optical imaging lens assembly of the example 1, respectively;

FIG. 5 illustrates a schematic structural view of an optical imaging lens assembly according to example 3 of the present disclosure;

FIGS. 6A to 6D illustrate a longitudinal aberration curve, an astigmatic curve, a distortion curve, and a lateral color curve of the optical imaging lens assembly of the example 3, respectively;

FIGS. 10A to 10D illustrate a longitudinal aberration curve, an astigmatic curve, a distortion curve, and a lateral color curve of the optical imaging lens assembly of the example 5, respectively;

FIG. 11 illustrates a schematic structural view of an optical imaging lens assembly according to example 6 of the present disclosure;

DETAILED DESCRIPTION OF EMBODIMENTS

Figure 2C:
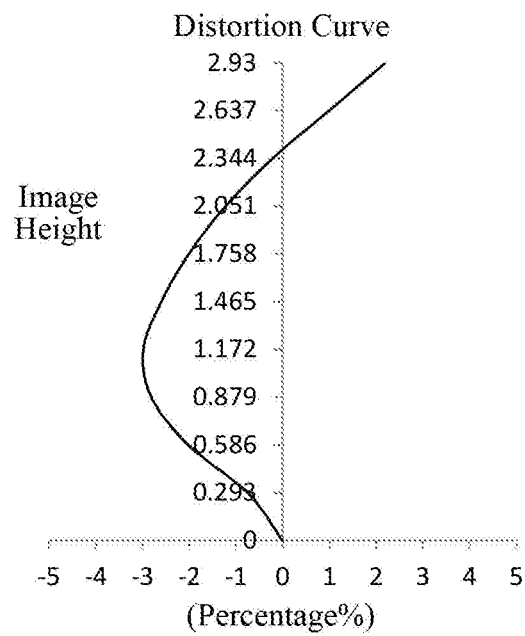

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include six lenses having refractive power, which are a first lens, a second lens, a third lens, a fourth lens, a fifth lens and a sixth lens. The six lenses are arranged sequentially from an object side to an image side along an optical axis. Among the first lens to the sixth lens, there may be a spaced interval between each two adjacent lenses.

In an exemplary embodiment, the first lens has refractive power; the second lens has refractive power, an object-side surface thereof may be a convex surface, and an image-side surface thereof may be a concave surface; the third lens has refractive power; the fourth lens may have negative refractive power; the fifth lens may have negative refractive power, an object-side surface thereof may be a concave surface, and an image-side surface thereof may be a convex surface; and the sixth lens has refractive power, an object-side surface thereof may be a concave surface, and an image-side surface thereof may be a convex surface.

By configuring the second lens to have a convex object-side surface and a concave image-side surface, the field-of-view angle of the telephoto lens assembly may be reasonably controlled. At the same time, it is also beneficial to reduce the incident angle of the light at the position of the stop, reduce pupil aberration, and thereby improving the image quality. The fourth lens having negative refractive power is beneficial to reducing the spherical aberration and astigmatic of the optical imaging lens assembly, thereby improving the image quality of the optical imaging lens assembly. By configuring the fifth lens to have negative refractive power, a concave object-side surface and a convex image-side surface, and configuring the sixth lens to have refractive power, a concave object-side surface and a convex image-side surface, it is beneficial to achieve the compact structure of the optical imaging lens assembly and improve the relative illumination of the optical imaging lens assembly.

In an exemplary embodiment, the optical imaging lens assembly according to the present disclosure may satisfy: TTL/f<1, where TTL is a distance along the optical axis from an object-side surface of the first lens to an imaging plane of the optical imaging lens assembly, and f is a total effective focal length of the optical imaging lens assembly. More specifically, TTL and f may satisfy: TTL/f<0.95. Satisfying TTL/f<1 may make the optical imaging lens assembly have telephoto characteristics.

In an exemplary embodiment, the optical imaging lens assembly according to the present disclosure may satisfy: 1.0<CT1/(CT2+CT3)<2.0, where CT1 is a center thickness of the first lens along the optical axis, CT2 is a center thickness of the second lens along the optical axis, and CT3 is a center thickness of the third lens along the optical axis. More specifically, CT1, CT2 and CT3 may further satisfy: 1.3<CT1/(CT2+CT3)<1.8. Satisfying 1.0<CT1/(CT2+CT3) <2.0 may effectively restrict the shape of the second lens and the third lens, and may reasonably control the range of residual distortion after the second lens and the third lens are compensated to ensure the optical imaging lens assembly has a good distortion performance.

In an exemplary embodiment, the optical imaging lens assembly according to the present disclosure may satisfy: 3.0<(R3+R4)/(R3−R4)<3.5, where R3 is a radius of curvature of the object-side surface of the second lens, and R4 is a radius of curvature of the image-side surface of the second lens. More specifically, R3 and R4 may further satisfy: 3.0<(R3+R4)/(R3−R4)<3.3. When 3.0<(R3+R4)/(R3−R4) <3.5 is satisfied, the coma contributed by the second lens may be controlled within a reasonable range, which may effectively compensate the coma generated by the front lens, thereby obtaining good image quality.

In an exemplary embodiment, the optical imaging lens assembly according to the present disclosure may satisfy: 4.5<R6/R5<6.0, where R5 is a radius of curvature of an object-side surface of the third lens, and R6 is a radius of curvature of an image-side surface of the third lens. More specifically, R6 and R5 may further satisfy: 4.6<R6/R5<5.7. Satisfying 4.5<R6/R5<6.0 may effectively control the deflection angle of light after passing through the third lens, so that the light of each field-of-view of the optical imaging lens assembly may better match the chief ray angle (CRA) of the chip when it reaches the imaging plane.

In an exemplary embodiment, the optical imaging lens assembly according to the present disclosure may satisfy: 1.5<R8/(R7*3)<3.0, where R7 is a radius of curvature of an object-side surface of the fourth lens, and R8 is a radius of curvature of an image-side surface of the fourth lens. More specifically, R8 and R7 may further satisfy: 1.7<R8/(R7*3) <3.0. Satisfying 1.5<R8/(R7*3)<3.0 may effectively control the change of thickness of the fourth lens in the direction perpendicular to the optical axis, thereby ensuring that the fourth lens has good processing performance.

In an exemplary embodiment, the optical imaging lens assembly according to the present disclosure may satisfy: 1.5<R10/R9<2.5, where R9 is a radius of curvature of the object-side surface of the fifth lens, and R10 is a radius of curvature of the image-side surface of the fifth lens. More specifically, R10 and R9 may further satisfy: 1.8<R10/R9<2.5. Satisfying 1.5<R10/R9<2.5 may effectively eliminate the dispersion of the optical imaging lens assembly, and may improve the relative illumination of the optical imaging lens assembly.

In an exemplary embodiment, the optical imaging lens assembly according to the present disclosure may satisfy: 1.5<R11/R12<4.5, where R11 is a radius of curvature of the object-side surface of the sixth lens, and R12 is a radius of curvature of the image-side surface of the sixth lens. More specifically, R11 and R12 may further satisfy: 1.8<R11/R12<4.5. Satisfying 1.5<R11/R12<4.5 may better reduce the effective aperture of the aspheric surface of the rear lens, which may provide more layout space for the structure and reduce the impact of stray light in use.

In an exemplary embodiment, the optical imaging lens assembly according to the present disclosure may satisfy: 1.5≤T23/CT3<4.5, where T23 is a spaced interval between the second lens and the third lens along the optical axis, and CT3 is a center thickness of the third lens along the optical axis. More specifically, T23 and CT3 may further satisfy: 1.5≤T23/CT3<2. Satisfying 1.5≤T23/CT3<4.5 may effectively reduce the total length of the optical imaging lens assembly so as to ensure the lightness and thinness of the front end of the optical imaging lens assembly, and may reduce the processing difficulty of the optical imaging lens assembly.

In an exemplary embodiment, the optical imaging lens assembly according to the present disclosure may satisfy: 1.5<CT6/T56<2.5, where CT6 is a center thickness of the sixth lens along the optical axis, and T56 is a spaced interval between the fifth lens and the sixth lens along the optical axis. More specifically, CT6 and T56 may further satisfy: 1.8<CT6/T56<2.5. Satisfying 1.5<CT6/T56<2.5 may effectively control the field curvature and optical distortion of the optical imaging lens assembly, thereby ensuring that the optical imaging lens assembly has good image quality.

In an exemplary embodiment, the optical imaging lens assembly according to the present disclosure may satisfy: 2.5<R2/f1<5.5, where R2 is a radius of curvature of an image-side surface of the first lens, and f1 is an effective focal length of the first lens. More specifically, R2 and f1 may further satisfy: 2.7<R2/f1<5.5. Satisfying 2.5<R2/f1<5.5 may effectively control the curvature of the object-side surface of the first lens to make the field curvature contributed by the object-side surface of the first lens within a reasonable range, thereby reducing the optical sensitivity thereof.

In an exemplary embodiment, the optical imaging lens assembly according to the present disclosure may satisfy: −2.0<f2/R3<−1.0, where f2 is an effective focal length of the second lens, and R3 is a radius of curvature of the object-side surface of the second lens. More specifically, f2 and R3 may further satisfy: −1.7<f2/R3<−1.3. Satisfying −2.0<f2/R3<−1.0 may control the deflection angle of light after passing through the second lens to be within a reasonable range, and avoid the total reflection caused by the large changes in the light angle during the optimization process of the optical imaging lens assembly.

In an exemplary embodiment, the optical imaging lens assembly according to the present disclosure may satisfy: 2.0<f5/R9<2.5, where f5 is an effective focal length of the fifth lens, and R9 is a radius of curvature of the object-side surface of the fifth lens. More specifically, f5 and R9 may further satisfy: 2.0<f5/R9<2.4. When 2.0<f5/R9<2.5 is satisfied, the curvature of the image-side surface of the fifth lens may be controlled, and the chromatic aberration on the optical axis may be effectively reduced, thereby ensuring that the optical imaging lens assembly has better image quality.

In an exemplary embodiment, the optical imaging lens assembly according to the present disclosure may further include a stop disposed between the object side and the first lens. Optionally, the above optical imaging lens assembly may further include an optical filter for correcting the color deviation and/or a protective glass for protecting the photosensitive element located on an imaging plane.

The optical imaging lens assembly according to the above embodiments of the present disclosure may employ a plurality of lenses, such as six lenses as described above. By properly configuring the refractive power of each lens, the surface shape, the center thickness of each lens, and spaced intervals along the optical axis between the lenses, the incident light may be effectively converged, the total optical length of the imaging lens assembly may be reduced, and the workability of the imaging lens assembly may be improved, such that the optical imaging lens assembly is more advantageous for production processing and may be applied to, for example, portable electronic products. The present disclosure proposes a six-piece telephoto optical imaging lens assembly, which may achieve telephoto characteristics while having the characteristics of high imaging quality. In the optical imaging lens assembly according to the present disclosure, each optical lens has an appropriate thickness, which avoids problems such as short back focus and difficult processing of the imaging system caused by the excessive thickness of the optical lens.

In the embodiments of the present disclosure, at least one of the surfaces of lenses is aspheric, that is, at least one of the object-side surface of the first lens to the image-side surface of the sixth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens, the fifth lens and the sixth lens is aspheric. Optionally, the object-side surface and the image-side surface of each of the first lens, the second lens, the third lens, the fourth lens, the fifth lens and the sixth lens are aspheric.

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking six lenses as an example, the optical imaging lens assembly is not limited to include six lenses. The optical imaging lens assembly may also include other numbers of lenses if desired.

Some specific examples of an optical imaging lens assembly applicable to the above embodiment will be further described below with reference to the accompanying drawings.

Example 1

An optical imaging lens assembly according to example 1 of the present disclosure is described below with reference to FIG. 1 to FIG. 2D. FIG. 1 shows a schematic structural view of the optical imaging lens assembly according to example 1 of the present disclosure.

As shown in FIG. 1, the optical imaging lens assembly includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a convex surface. The sixth lens E6 has negative refractive power, an object-side surface S11 thereof is a concave surface, and an image-side surface S12 thereof is a convex surface. The optical filter E7 has an object-side surface S13 and an image-side surface S14. Light from an object sequentially passes through the respective surfaces S1 to S14 and is finally imaged on the imaging plane S15.

Table 1 is a table illustrating basic parameters of the optical imaging lens assembly of example 1, wherein the units for the radius of curvature, the thickness/distance and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7885 | | | | |
| S1 | Aspheric | 1.9877 | 0.9319 | 1.55 | 56.1 | 3.57 | 0.0000 |
| S2 | Aspheric | 10.0194 | 0.0300 | | | | 0.0000 |
| S3 | Aspheric | 4.6072 | 0.2385 | 1.68 | 19.2 | −6.68 | 0.0000 |
| S4 | Aspheric | 2.3848 | 0.6367 | | | | 0.0000 |
| S5 | Aspheric | 2.7752 | 0.4257 | 1.54 | 55.7 | 21.20 | −0.3592 |
| S6 | Aspheric | 13.1428 | 0.5013 | | | | 0.0000 |
| S7 | Aspheric | −2.2932 | 0.2385 | 1.67 | 20.4 | −58.12 | 0.0000 |
| S8 | Aspheric | −12.9062 | 0.7728 | | | | 0.0000 |
| S9 | Aspheric | −2.1602 | 0.2463 | 1.54 | 55.7 | −5.01 | 0.0000 |

TABLE 1-continued

| Surface number | Surface type | Radius of curvature | Thickness/ Distance | Material Refractive index | Material Abbe number | Focal length | Conic coefficient |
|---|---|---|---|---|---|---|---|
| S10 | Aspheric | −4.8886 | 0.4187 | | | | 0.0000 |
| S11 | Aspheric | −7.1705 | 0.8189 | 1.68 | 19.2 | −49.00 | 0.0000 |
| S12 | Aspheric | −3.6780 | 0.0300 | | | | 0.0000 |
| S13 | Spherical | Infinite | 0.2100 | 1.52 | 64.2 | | |
| S14 | Spherical | Infinite | 0.5407 | | | | |
| S15 | Spherical | Infinite | | | | | |

In this example, a total effective focal length f of the optical imaging lens assembly is 6.66 mm, a total length TTL of the optical imaging lens assembly (that is, a distance along the optical axis from the object-side surface S1 of the first lens E1 to the imaging surface S15 of the optical imaging lens assembly) is 6.04 mm, half of a diagonal length ImgH of an effective pixel area on the imaging plane S15 of the optical imaging lens assembly is 2.93 mm, half of a maximal field-of-view Semi-FOV of the optical imaging lens assembly is 23.5°, and an aperture value Fno of the optical imaging lens assembly is 2.10.

In example 1, the object-side surface and the image-side surface of any one of the first lens E1 to the sixth lens E6 are aspheric. The surface shape x of each aspheric lens may be defined by using, but not limited to, the following aspheric formula:

$$x = \frac{ch^2}{1+\sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S12 in example 1.

TABLE 2

| Surface number | A4 | A6 | A8 | A10 | A12 | A14 | A16 | A18 | A20 |
|---|---|---|---|---|---|---|---|---|---|
| S1 | 7.2801E−02 | −1.7251E−02 | 2.8541E−03 | −3.1427E−04 | 1.7121E−04 | −7.7841E−05 | −1.5806E−04 | 1.6228E−04 | −7.0834E−05 |
| S2 | −6.1271E−02 | −2.1414E−03 | −2.5517E−03 | 2.0958E−03 | −4.0534E−03 | 1.2778E−03 | −1.3946E−03 | −3.1363E−04 | −8.8326E−04 |
| S3 | −6.5410E−02 | 1.3605E−02 | 6.3188E−03 | −6.0736E−04 | −5.7237E−04 | −2.6532E−04 | −8.3896E−04 | −3.7277E−04 | 5.0697E−05 |
| S4 | −7.6870E−02 | 1.8582E−02 | 6.3931E−03 | 3.0877E−04 | −2.5708E−04 | 6.7246E−06 | 2.7878E−05 | −2.8774E−04 | 1.9507E−04 |
| S5 | −1.4782E−01 | 3.9026E−02 | −5.5423E−03 | 5.3033E−03 | −3.4696E−03 | 1.7591E−03 | −7.7026E−04 | 2.5050E−04 | −6.1816E−05 |
| S6 | 1.0573E−01 | −9.0933E−02 | 7.5412E−03 | 2.8654E−04 | −9.7392E−04 | 3.8873E−04 | −8.1830E−05 | −2.5745E−06 | 2.7380E−05 |
| S7 | 3.0468E−01 | 6.3964E−02 | −2.5967E−02 | 7.1893E−03 | 4.0627E−03 | −7.6307E−03 | 4.7974E−03 | −1.6030E−03 | 2.2213E−04 |
| S8 | −1.8513E−01 | 1.8124E−01 | −4.0032E−02 | 5.4725E−03 | 3.1286E−03 | −4.8039E−03 | 2.1306E−03 | −3.2886E−04 | −1.2947E−05 |
| S9 | −1.4902E−01 | 2.5471E−01 | −5.0531E−02 | 3.3654E−02 | −1.9637E−02 | 5.6607E−03 | −2.7750E−03 | 5.6415E−03 | −1.5244E−03 |
| S10 | 4.2873E−01 | 7.5995E−02 | 5.1452E−02 | 7.8076E−02 | −8.8260E−02 | 5.4265E−02 | −2.3736E−02 | 1.2131E−02 | 2.7311E−03 |
| S11 | −2.9068E−01 | 1.9328E−01 | 4.8626E−02 | −5.7456E−02 | −1.6643E−02 | 1.4902E−02 | 1.7312E−02 | 1.4378E−03 | 3.8627E−03 |
| S12 | −1.9984E−01 | 2.9121E−01 | 1.4677E−02 | −9.2936E−02 | 1.0402E−01 | −2.7044E−02 | 2.6007E−02 | −4.8560E−03 | 3.6561E−03 |

Figure 2D:
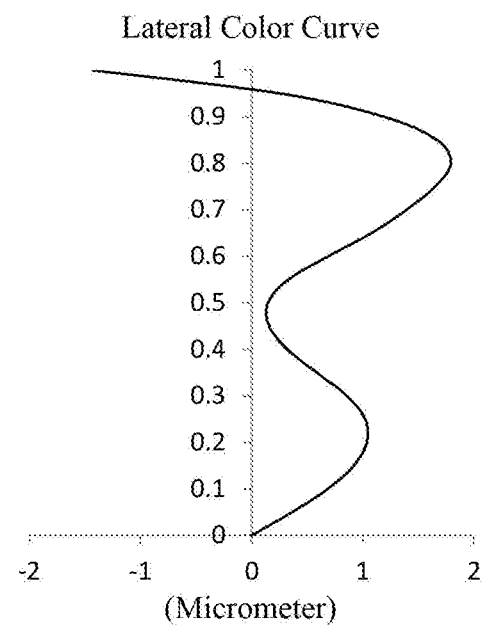

FIG. 2A illustrates a longitudinal aberration curve of the optical imaging lens assembly according to example 1, representing deviations of focal points converged by light of different wavelengths after passing through the lens assembly. FIG. 2B illustrates an astigmatic curve of the optical imaging lens assembly according to example 1, representing a curvature of a tangential plane and a curvature of a sagittal plane. FIG. 2C illustrates a distortion curve of the optical imaging lens assembly according to example 1, representing amounts of distortion corresponding to different image heights. FIG. 2D illustrates a lateral color curve of the optical imaging lens assembly according to example 1, representing deviations of different image heights on an imaging plane after light passes through the lens assembly. It can be seen from FIG. 2A to FIG. 2D that the optical imaging lens assembly provided in example 1 may achieve good image quality.

Example 2

Figure 3:
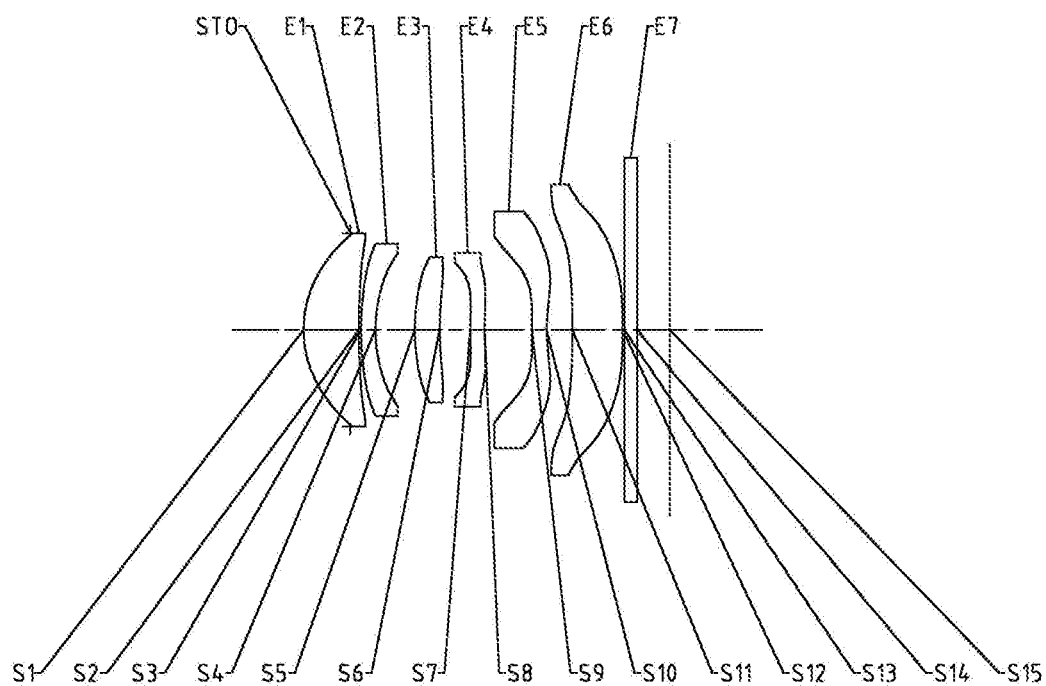
FIG. 3 illustrates a schematic structural view of an optical imaging lens assembly according to example 2 of the present disclosure.

An optical imaging lens assembly according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the optical imaging lens assembly according to example 2 of the present disclosure.

As shown in FIG. 3, the optical imaging lens assembly includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a convex surface. The sixth lens E6 has positive refractive power, an object-side surface S11 thereof is a concave surface, and an image-side surface S12 thereof is a convex surface. The optical filter E7 has an object-side surface S13 and an image-side surface S14. Light from an object sequentially passes through the respective surfaces S1 to S14 and is finally imaged on the imaging plane S15.

In this example, a total effective focal length f of the optical imaging lens assembly is 6.60 mm, a total length TTL of the optical imaging lens assembly is 6.04 mm, half of a diagonal length ImgH of an effective pixel area on the imaging plane S15 of the optical imaging lens assembly is 2.93 mm, half of a maximal field-of-view Semi-FOV of the optical imaging lens assembly is 23.6°, and an aperture value Fno of the optical imaging lens assembly is 2.10.

Table 3 is a table illustrating basic parameters of the optical imaging lens assembly of example 2, wherein the units for the radius of curvature, the thickness/distance and the focal length are millimeter (mm). Table 4 shows high-order coefficients applicable to each aspheric surface in example 2, wherein the surface shape of each aspheric surface may be defined by the formula (1) given in the above example 1.

Figure 4A:
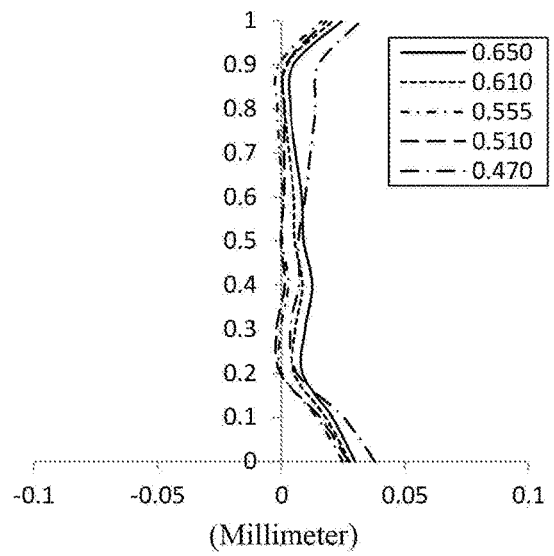
FIGS. 4A to 4D illustrate a longitudinal aberration curve, an astigmatic curve, a distortion curve, and a lateral color curve of the optical imaging lens assembly of the example 2, respectively.
Figure 4B:
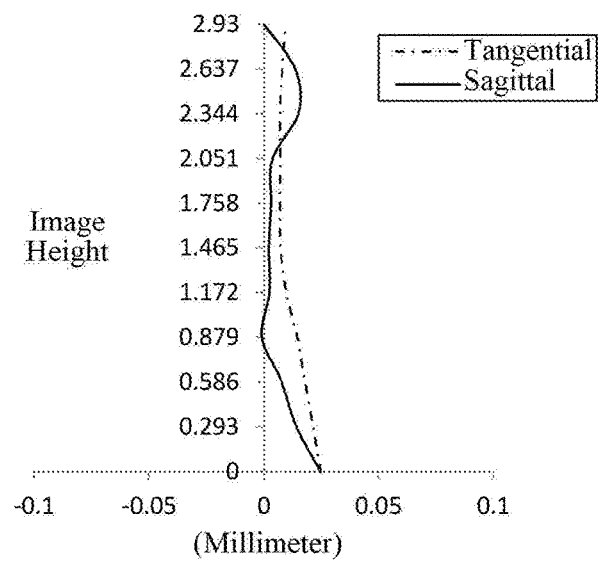
Figure 4C:
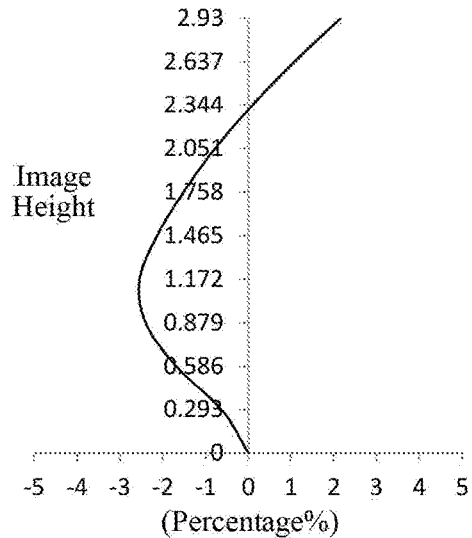
Figure 4D:
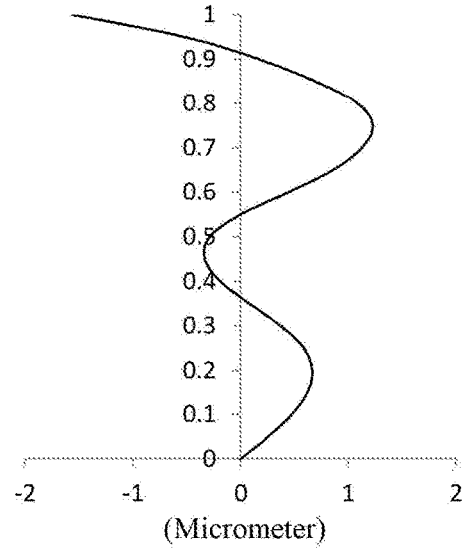

FIG. 4A illustrates a longitudinal aberration curve of the optical imaging lens assembly according to example 2, representing deviations of focal points converged by light of different wavelengths after passing through the lens assembly. FIG. 4B illustrates an astigmatic curve of the optical imaging lens assembly according to example 2, representing a curvature of a tangential plane and a curvature of a sagittal plane. FIG. 4C illustrates a distortion curve of the optical imaging lens assembly according to example 2, representing amounts of distortion corresponding to different image heights. FIG. 4D illustrates a lateral color curve of the optical imaging lens assembly according to example 2, representing deviations of different image heights on an imaging plane after light passes through the lens assembly. It can be seen from FIG. 4A to FIG. 4D that the optical imaging lens assembly provided in example 2 may achieve good image quality.

Example 3

An optical imaging lens assembly according to example 3 of the present disclosure is described below with reference to FIG. 5 to FIG. 6D. FIG. 5 shows a schematic structural view of the optical imaging lens assembly according to example 3 of the present disclosure.

As shown in FIG. 5, the optical imaging lens assembly includes a stop STO, a first lens E1, a second lens E2, a third

TABLE 3

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7696 | | | | |
| S1 | Aspheric | 1.9884 | 0.9165 | 1.55 | 56.1 | 3.58 | 0.0000 |
| S2 | Aspheric | 10.2840 | 0.0300 | | | | 0.0000 |
| S3 | Aspheric | 4.4514 | 0.2385 | 1.68 | 19.2 | −6.80 | 0.0000 |
| S4 | Aspheric | 2.3326 | 0.6472 | | | | 0.0000 |
| S5 | Aspheric | 2.8213 | 0.4125 | 1.54 | 55.7 | 21.84 | −0.3879 |
| S6 | Aspheric | 14.6214 | 0.5029 | | | | 0.0000 |
| S7 | Aspheric | −2.3061 | 0.2385 | 1.67 | 20.4 | −50.64 | 0.0000 |
| S8 | Aspheric | −14.3196 | 0.7789 | | | | 0.0000 |
| S9 | Aspheric | −2.2228 | 0.2409 | 1.54 | 55.7 | −4.85 | 0.0000 |
| S10 | Aspheric | −5.0557 | 0.4276 | | | | 0.0000 |
| S11 | Aspheric | −7.7044 | 0.8258 | 1.68 | 19.2 | 142.87 | 0.0000 |
| S12 | Aspheric | −3.7666 | 0.0300 | | | | 0.0000 |
| S13 | Spherical | Infinite | 0.2100 | 1.52 | 64.2 | | |
| S14 | Spherical | Infinite | 0.5407 | | | | |
| S15 | Spherical | Infinite | | | | | |

TABLE 4

| Surface number | A4 | A6 | A8 | A10 | A12 | A14 | A16 | A18 | A20 |
|---|---|---|---|---|---|---|---|---|---|
| S1 | 7.5593E−02 | −1.7369E−02 | 2.6307E−03 | −8.8237E−05 | −1.3385E−05 | 4.6633E−05 | −1.8792E−04 | 1.4240E−04 | −5.1182E−05 |
| S2 | −5.9324E−02 | −2.5937E−03 | −3.0360E−03 | 2.7836E−03 | −3.6104E−03 | 8.5016E−04 | −8.9315E−04 | −8.5407E−05 | −8.2823E−04 |
| S3 | −6.7020E−02 | 1.2954E−02 | 6.7559E−03 | −6.2286E−04 | −5.4432E−04 | −2.1435E−05 | −6.0388E−04 | −3.3824E−04 | 3.9501E−05 |
| S4 | −7.7191E−02 | 1.8124E−02 | 6.2934E−03 | 4.2047E−03 | −4.6222E−04 | 1.8163E−04 | 1.8702E−05 | −2.4683E−04 | 1.4687E−04 |
| S5 | −1.4747E−01 | 3.9030E−02 | −5.9500E−03 | 5.3792E−03 | −3.7184E−03 | 2.0134E−03 | −9.1546E−04 | 3.1779E−04 | −7.5525E−05 |
| S6 | 1.0724E−01 | −8.6015E−03 | 7.0983E−03 | 1.1802E−04 | −8.6680E−04 | 4.1279E−04 | −1.1910E−04 | 2.6438E−05 | 1.2980E−05 |
| S7 | 3.0715E−01 | 6.5307E−02 | −2.6401E−02 | 7.0156E−03 | 4.0030E−03 | −7.6785E−03 | 5.1852E−03 | −1.9293E−03 | 3.4474E−04 |
| S8 | −1.8320E−01 | 1.8193E−01 | −3.9094E−02 | 5.0199E−03 | 3.1970E−03 | −5.1444E−03 | 2.8271E−03 | −7.9152E−04 | 1.2975E−04 |
| S9 | −1.4738E−01 | 2.6378E−01 | −3.2233E−02 | 3.5619E−02 | −1.8421E−02 | 4.8734E−03 | −3.2223E−03 | 7.6713E−03 | −3.3156E−03 |
| S10 | 4.5928E−01 | 9.0810E−02 | 6.2004E−02 | 8.4861E−02 | −7.9920E−02 | 5.7029E−02 | −3.0972E−02 | 1.9339E−02 | 3.0398E−03 |
| S11 | −2.7510E−01 | 1.9609E−01 | 3.5336E−02 | −5.4929E−02 | −3.0199E−03 | 7.0961E−03 | 1.3480E−02 | 2.0147E−03 | 7.1063E−03 |
| S12 | −2.8502E−01 | 2.9994E−01 | 5.9561E−03 | −9.7483E−02 | 1.1529E−01 | −3.8701E−02 | 2.7496E−02 | −2.6964E−03 | −8.9062E−04 | lens E3, a fourth lens E4, a fifth lens E5, a sixth lens E6, an optical filter E7 and an imaging plane S15, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a convex surface. The sixth lens E6 has negative refractive power, an object-side surface S11 thereof is a concave surface, and an image-side surface S12 thereof is a convex surface. The optical filter E7 has an object-side surface S13 and an image-side surface S14. Light from an object sequentially passes through the respective surfaces S1 to S14 and is finally imaged on the imaging plane S15.

In this example, a total effective focal length f of the optical imaging lens assembly is 6.64 mm, a total length TTL of the optical imaging lens assembly is 6.03 mm, half of a diagonal length ImgH of an effective pixel area on the imaging plane S15 of the optical imaging lens assembly is 2.93 mm, half of a maximal field-of-view Semi-FOV of the optical imaging lens assembly is 23.5°, and an aperture value Fno of the optical imaging lens assembly is 2.10.

Table 5 is a table illustrating basic parameters of the optical imaging lens assembly of example 3, wherein the units for the radius of curvature, the thickness/distance and the focal length are millimeter (mm). Table 6 shows high-order coefficients applicable to each aspheric surface in example 3, wherein the surface shape of each aspheric surface may be defined by the formula (1) given in the above example 1.

TABLE 5

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | −0.7793 | | | | |
| S1 | Aspheric | 1.9913 | 0.9327 | 1.55 | 56.1 | 3.54 | 0.0000 |
| S2 | Aspheric | 11.1279 | 0.0300 | | | | 0.0000 |
| S3 | Aspheric | 4.5744 | 0.2385 | 1.68 | 19.2 | −6.74 | 0.0000 |
| S4 | Aspheric | 2.3624 | 0.6460 | | | | 0.0000 |
| S5 | Aspheric | 2.8206 | 0.4085 | 1.54 | 55.7 | 24.37 | −0.4192 |
| S6 | Aspheric | 13.3995 | 0.4999 | | | | 0.0000 |
| S7 | Aspheric | −2.3089 | 0.2385 | 1.67 | 20.4 | −44.19 | 0.0000 |
| S8 | Aspheric | −15.8885 | 0.7712 | | | | 0.0000 |
| S9 | Aspheric | −2.2169 | 0.2320 | 1.54 | 55.7 | −5.00 | 0.0000 |
| S10 | Aspheric | −4.8958 | 0.4208 | | | | 0.0000 |
| S11 | Aspheric | −7.3213 | 0.8218 | 1.68 | 19.2 | −1166.46 | 0.0000 |
| S12 | Aspheric | −3.7165 | 0.0394 | | | | 0.0000 |
| S13 | Spherical | Infinite | 0.2100 | 1.52 | 64.2 | | |
| S14 | Spherical | Infinite | 0.5407 | | | | |
| S15 | Spherical | Infinite | | | | | |

TABLE 6

| Surface number | A4 | A6 | A8 | A10 | A12 | A14 | A16 | A18 | A20 |
|---|---|---|---|---|---|---|---|---|---|
| S1 | 7.6112E−02 | −1.7287E−02 | 2.5620E−03 | 9.1511E−06 | −8.1575E−05 | 4.6361E−05 | −1.5925E−04 | 1.3531E−04 | −6.2580E−05 |
| S2 | −5.7620E−02 | −2.1320E−03 | −3.6172E−03 | 3.0680E−03 | −3.1270E−03 | 3.1788E−04 | −1.0925E−03 | −3.9582E−05 | −9.6779E−04 |
| S3 | −6.7927E−02 | 1.2593E−02 | 6.7661E−03 | −4.3856E−04 | −8.0289E−04 | −2.0295E−04 | −6.9911E−04 | −3.2414E−04 | 5.5107E−05 |
| S4 | −7.8462E−02 | 1.7548E−02 | 6.2638E−03 | 5.0262E−04 | −5.9848E−04 | 1.7305E−04 | −2.2079E−05 | −2.4486E−04 | 1.7225E−04 |
| S5 | −1.4850E−01 | 3.9198E−02 | −5.7958E−03 | 5.2252E−03 | −3.5049E−03 | 1.8369E−03 | −8.3452E−04 | 2.9135E−04 | −7.3896E−05 |
| S6 | 1.0789E−01 | −8.8644E−03 | 7.3284E−03 | 3.6663E−03 | −1.0078E−03 | 4.2007E−04 | −9.8174E−05 | 1.1366E−05 | 2.0831E−05 |
| S7 | 3.0800E−01 | 6.5889E−02 | −2.6330E−02 | 7.4238E−03 | 3.9410E−03 | −7.8299E−03 | 5.1956E−03 | −1.8545E−03 | 3.0444E−04 |
| S8 | −1.8237E−01 | 1.8209E−01 | −3.8294E−02 | 5.1971E−03 | 3.1993E−03 | −5.2744E−03 | 2.7915E−03 | −7.0565E−04 | 9.8803E−05 |
| S9 | −1.5321E−01 | 2.6743E−01 | −2.6958E−02 | 3.2950E−02 | −1.8014E−02 | 3.7047E−03 | −3.7903E−03 | 9.5829E−03 | −3.8566E−03 |
| S10 | 4.5038E−01 | 8.1890E−02 | 6.8210E−02 | 8.7344E−02 | −8.2603E−02 | 5.7313E−02 | −3.5238E−02 | 2.2579E−02 | 5.0333E−03 |
| S11 | −2.9290E−01 | 1.8224E−01 | 3.4843E−02 | −4.7219E−02 | −2.1850E−03 | 3.3079E−03 | 1.2242E−02 | 5.5097E−03 | 1.0334E−02 |
| S12 | −3.2161E−01 | 2.9639E−01 | 9.9789E−03 | −9.3291E−02 | 1.1613E−01 | −3.9704E−02 | 2.9611E−02 | 7.1794E−04 | −3.3156E−03 |

Figure 6C:
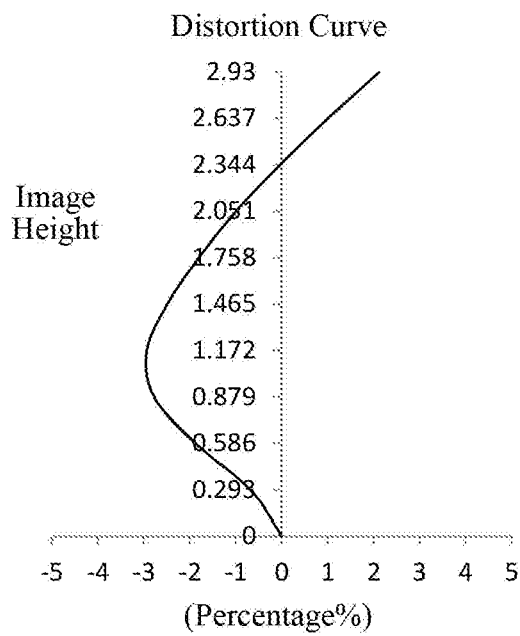
Figure 6D:
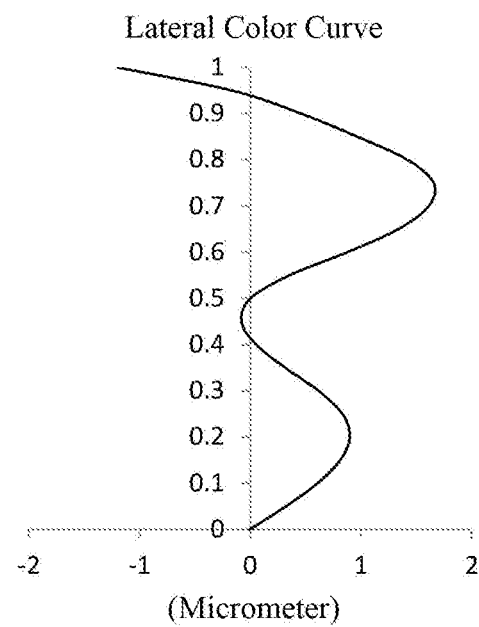

FIG. 6A illustrates a longitudinal aberration curve of the optical imaging lens assembly according to example 3, representing deviations of focal points converged by light of different wavelengths after passing through the lens assembly. FIG. 6B illustrates an astigmatic curve of the optical imaging lens assembly according to example 3, representing a curvature of a tangential plane and a curvature of a sagittal plane. FIG. 6C illustrates a distortion curve of the optical imaging lens assembly according to example 3, representing amounts of distortion corresponding to different image heights. FIG. 6D illustrates a lateral color curve of the optical imaging lens assembly according to example 3, representing deviations of different image heights on an imaging plane after light passes through the lens assembly. It can be seen from FIG. 6A to FIG. 6D that the optical imaging lens assembly provided in example 3 may achieve good image quality.

Example 4

Figure 7:
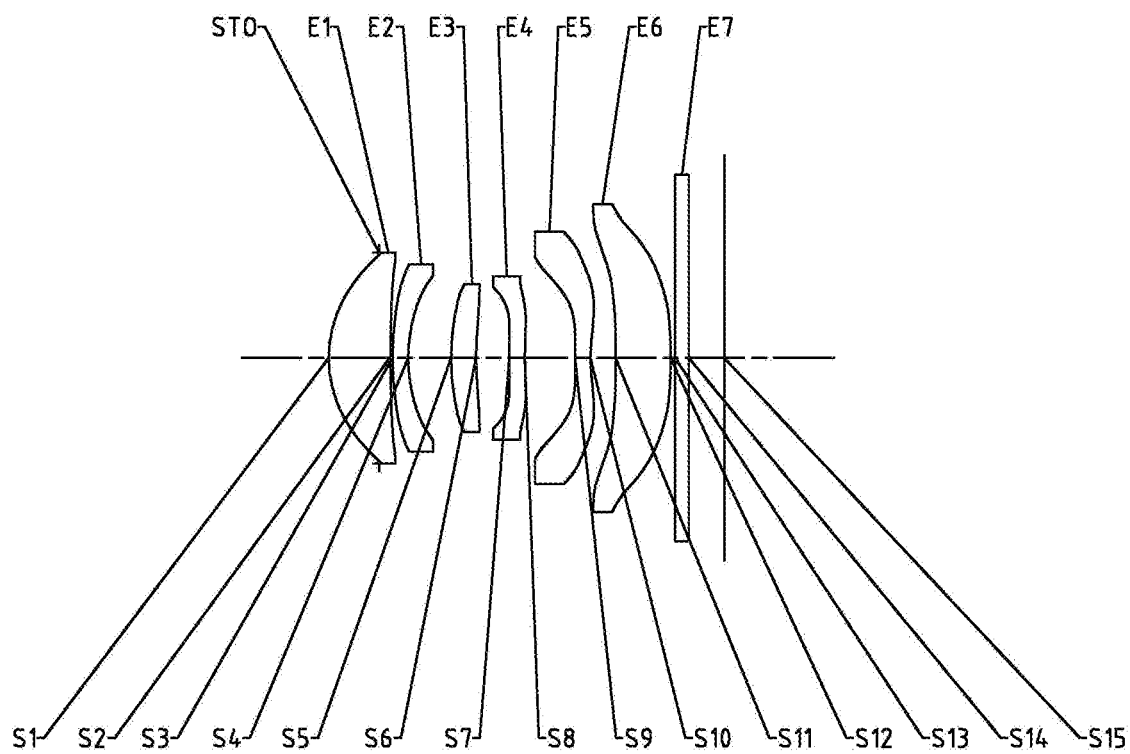
FIG. 7 illustrates a schematic structural view of an optical imaging lens assembly according to example 4 of the present disclosure.

An optical imaging lens assembly according to example 4 of the present disclosure is described below with reference to FIG. 7 to FIG. 8D. FIG. 7 shows a schematic structural view of the optical imaging lens assembly according to example 4 of the present disclosure.

As shown in FIG. 7, the optical imaging lens assembly includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a convex surface. The sixth lens E6 has positive refractive power, an object-side surface S11 thereof is a concave surface, and an image-side surface S12 thereof is a convex surface. The optical filter E7 has an object-side surface S13 and an image-side surface S14. Light from an object sequentially passes through the respective surfaces S1 to S14 and is finally imaged on the imaging plane S15.

In this example, a total effective focal length f of the optical imaging lens assembly is 6.65 mm, a total length TTL of the optical imaging lens assembly is 6.03 mm, half of a diagonal length ImgH of an effective pixel area on the imaging plane S15 of the optical imaging lens assembly is 2.93 mm, half of a maximal field-of-view Semi-FOV of the optical imaging lens assembly is 23.5°, and an aperture value Fno of the optical imaging lens assembly is 2.10.

Table 7 is a table illustrating basic parameters of the optical imaging lens assembly of example 4, wherein the units for the radius of curvature, the thickness/distance and the focal length are millimeter (mm). Table 8 shows high-order coefficients applicable to each aspheric surface in example 4, wherein the surface shape of each aspheric surface may be defined by the formula (1) given in the above example 1.

TABLE 7

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7664 | | | | |
| S1 | Aspheric | 2.0041 | 0.9427 | 1.55 | 56.1 | 3.46 | 0.0000 |
| S2 | Aspheric | 14.5724 | 0.0300 | | | | 0.0000 |
| S3 | Aspheric | 4.3562 | 0.2385 | 1.68 | 19.2 | −6.70 | 0.0000 |
| S4 | Aspheric | 2.2662 | 0.6544 | | | | 0.0000 |
| S5 | Aspheric | 2.9439 | 0.3814 | 1.54 | 55.7 | 29.79 | −0.4083 |
| S6 | Aspheric | 16.3832 | 0.5033 | | | | 0.0000 |
| S7 | Aspheric | −2.1513 | 0.2385 | 1.67 | 20.4 | −34.32 | 0.0000 |
| S8 | Aspheric | −13.8842 | 0.7668 | | | | 0.0000 |
| S9 | Aspheric | −2.2174 | 0.2320 | 1.54 | 55.7 | −4.79 | 0.0000 |
| S10 | Aspheric | −4.6575 | 0.3869 | | | | 0.0000 |
| S11 | Aspheric | −7.5413 | 0.8354 | 1.68 | 19.2 | 42.84 | 0.0000 |
| S12 | Aspheric | −3.7289 | 0.0693 | | | | 0.0000 |
| S13 | Spherical | Infinite | 0.2100 | 1.52 | 64.2 | | |
| S14 | Spherical | Infinite | 0.5407 | | | | |
| S15 | Spherical | Infinite | | | | | |

TABLE 8

| Surface number | A4 | A6 | A8 | A10 | A12 | A14 | A16 | A18 | A20 |
|---|---|---|---|---|---|---|---|---|---|
| S1 | 8.5320E−02 | −1.8439E−02 | 2.5194E−03 | 7.5576E−05 | −8.2750E−05 | −2.8605E−06 | −9.3871E−05 | 1.0483E−04 | −5.1596E−05 |
| S2 | −4.8932E−02 | −5.1743E−04 | −6.1988E−03 | 2.9363E−03 | −1.2707E−03 | −2.7505E−04 | −1.6669E−03 | 9.1651E−04 | −1.5295E−03 |
| S3 | −6.9913E−02 | 1.1462E−02 | 7.0017E−03 | −7.1806E−07 | −9.3897E−04 | −1.1814E−04 | −6.8339E−04 | −2.9174E−04 | 7.5038E−05 |
| S4 | −8.1686E−02 | 1.6317E−02 | 6.3158E−03 | 1.0433E−03 | −1.0007E−03 | 2.8346E−04 | 2.6673E−05 | −2.9941E−04 | 1.8339E−04 |
| S5 | −1.5438E−01 | 3.9355E−02 | −5.0432E−03 | 4.8596E−03 | −3.5979E−03 | 2.0930E−03 | −1.0632E−03 | 4.2488E−04 | −1.2182E−04 |
| S6 | 1.0898E−01 | −1.0541E−02 | 8.7626E−03 | 5.5762E−04 | −1.6012E−03 | 9.2291E−04 | −4.1724E−04 | 1.6143E−04 | −3.5200E−05 |

TABLE 8-continued

| Surface number | A4 | A6 | A8 | A10 | A12 | A14 | A16 | A18 | A20 |
|---|---|---|---|---|---|---|---|---|---|
| S7 | 3.1352E−01 | 6.6869E−02 | −2.6750E−02 | 8.2797E−03 | 3.8932E−03 | −8.4434E−03 | 5.7536E−03 | −2.1175E−03 | 3.7146E−04 |
| S8 | −1.8029E−01 | 1.8291E−01 | −3.7344E−02 | 5.3410E−03 | 3.1386E−03 | −5.7127E−03 | 3.2768E−03 | −1.0017E−03 | 1.8665E−04 |
| S9 | −1.7444E−01 | 2.6248E−01 | −2.0197E−02 | 3.2730E−02 | −2.0806E−02 | 4.1502E−03 | −2.8334E−03 | 8.5569E−03 | −2.5565E−03 |
| S10 | 4.6119E−01 | 7.4954E−02 | 7.2152E−02 | 8.9750E−03 | −8.7162E−02 | 5.8896E−02 | −3.7629E−02 | 2.5740E−02 | 5.0922E−03 |
| S11 | −2.7399E−01 | 1.7858E−01 | 3.4397E−02 | −4.0977E−02 | 8.4394E−04 | −1.3693E−03 | 1.1561E−02 | 6.0012E−03 | 1.2161E−02 |
| S12 | −4.3284E−01 | 3.3314E−01 | 2.8409E−03 | −9.3184E−02 | 1.1940E−01 | −4.5647E−02 | 3.1360E−02 | −1.8849E−03 | 1.1967E−03 |

Figure 8A:
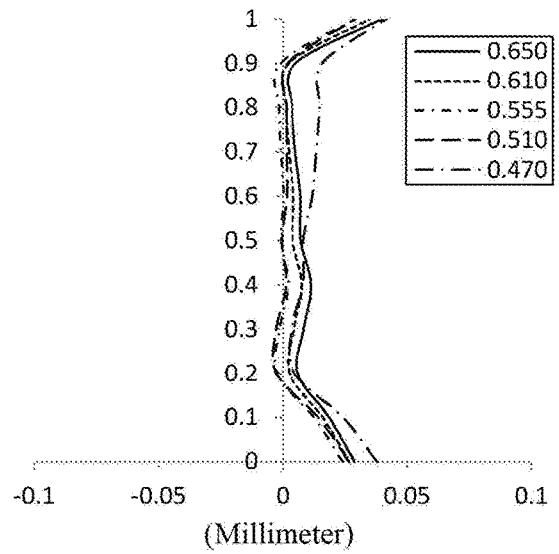
FIGS. 8A to 8D illustrate a longitudinal aberration curve, an astigmatic curve, a distortion curve, and a lateral color curve of the optical imaging lens assembly of the example 4, respectively.
Figure 8B:
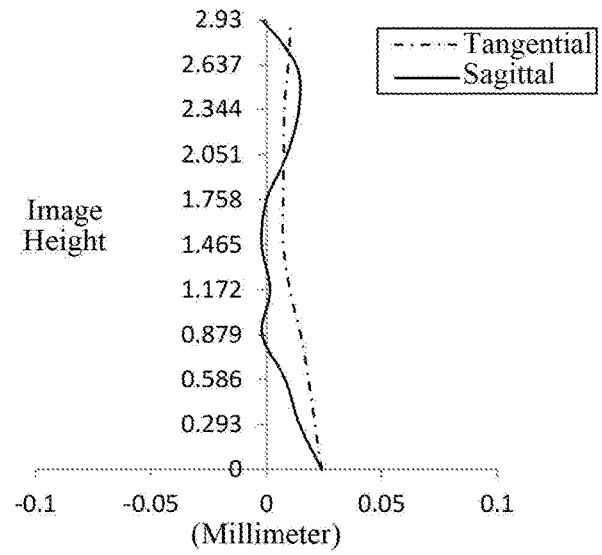
Figure 8C:
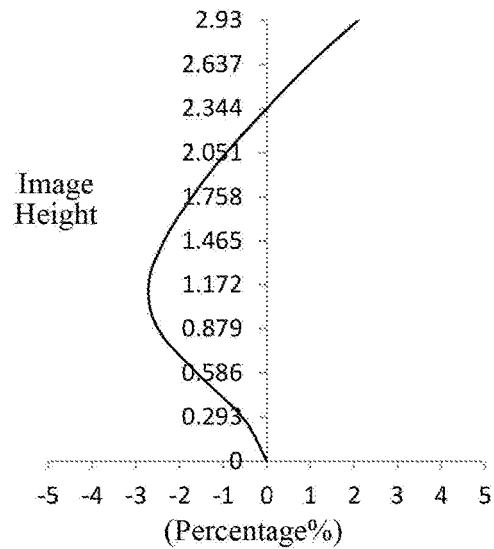
Figure 8D:
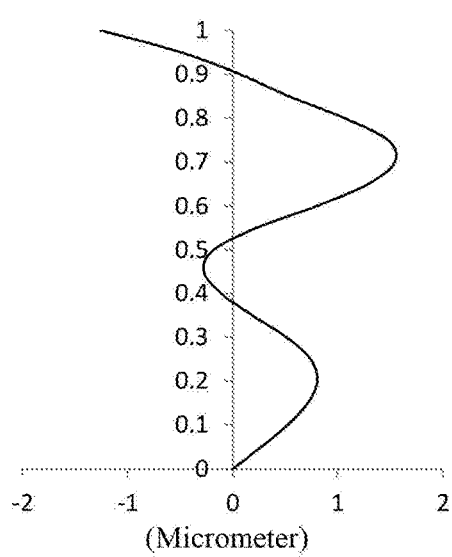

FIG. 8A illustrates a longitudinal aberration curve of the optical imaging lens assembly according to example 4, representing deviations of focal points converged by light of different wavelengths after passing through the lens assembly. FIG. 8B illustrates an astigmatic curve of the optical imaging lens assembly according to example 4, representing a curvature of a tangential plane and a curvature of a sagittal plane. FIG. 8C illustrates a distortion curve of the optical imaging lens assembly according to example 4, representing amounts of distortion corresponding to different image heights. FIG. 8D illustrates a lateral color curve of the optical imaging lens assembly according to example 4, representing deviations of different image heights on an imaging plane after light passes through the lens assembly. It can be seen from FIG. 8A to FIG. 8D that the optical imaging lens assembly provided in example 4 may achieve good image quality.

Example 5

Figure 9:
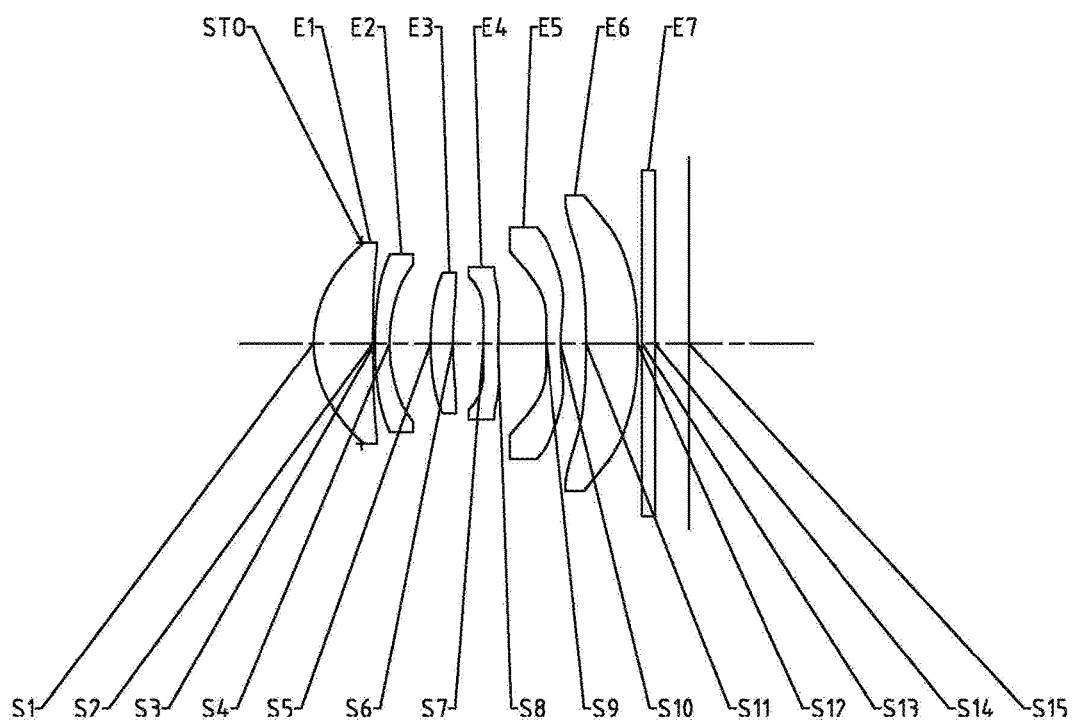
FIG. 9 illustrates a schematic structural view of an optical imaging lens assembly according to example 5 of the present disclosure.

An optical imaging lens assembly according to example 5 of the present disclosure is described below with reference to FIG. 9 to FIG. 10D. FIG. 9 shows a schematic structural view of the optical imaging lens assembly according to example 5 of the present disclosure.

As shown in FIG. 9, the optical imaging lens assembly includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a convex surface. The sixth lens E6 has positive refractive power, an object-side surface S11 thereof is a concave surface, and an image-side surface S12 thereof is a convex surface. The optical filter E7 has an object-side surface S13 and an image-side surface S14. Light from an object sequentially passes through the respective surfaces S to S14 and is finally imaged on the imaging plane S15.

In this example, a total effective focal length f of the optical imaging lens assembly is 6.64 mm, a total length TTL of the optical imaging lens assembly is 6.03 mm, half of a diagonal length ImgH of an effective pixel area on the imaging plane S15 of the optical imaging lens assembly is 2.93 mm, half of a maximal field-of-view Semi-FOV of the optical imaging lens assembly is 23.5°, and an aperture value Fno of the optical imaging lens assembly is 2.10.

Table 9 is a table illustrating basic parameters of the optical imaging lens assembly of example 5, wherein the units for the radius of curvature, the thickness/distance and the focal length are millimeter (mm). Table 10 shows high-order coefficients applicable to each aspheric surface in example 5, wherein the surface shape of each aspheric surface may be defined by the formula (1) given in the above example 1.

TABLE 9

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7681 | | | | |
| S1 | Aspheric | 1.9997 | 0.9495 | 1.55 | 56.1 | 3.43 | 0.0000 |
| S2 | Aspheric | 15.6475 | 0.0300 | | | | 0.0000 |
| S3 | Aspheric | 4.4117 | 0.2385 | 1.68 | 19.2 | −6.85 | 0.0000 |
| S4 | Aspheric | 2.2887 | 0.6557 | | | | 0.0000 |
| 55 | Aspheric | 2.9705 | 0.3621 | 1.54 | 55.7 | 35.87 | −0.4590 |
| S6 | Aspheric | 16.5415 | 0.4887 | | | | 0.0000 |
| S7 | Aspheric | −2.1055 | 0.2385 | 1.67 | 20.4 | −28.73 | 0.0000 |
| S8 | Aspheric | −15.9119 | 0.7751 | | | | 0.0000 |
| S9 | Aspheric | −2.1979 | 0.2320 | 1.54 | 55.7 | −4.78 | 0.0000 |
| S10 | Aspheric | −4.2236 | 0.4126 | | | | 0.0000 |
| S11 | Aspheric | −8.0259 | 0.8274 | 1.68 | 19.2 | 24.70 | 0.0000 |
| S12 | Aspheric | −3.8713 | 0.0693 | | | | 0.0000 |
| S13 | Spherical | Infinite | 0.2100 | 1.52 | 64.2 | | |
| S14 | Spherical | Infinite | 0.5407 | | | | |
| S15 | Spherical | Infinite | | | | | |

TABLE 10

| Surface number | A4 | A6 | A8 | A10 | A12 | A14 | A16 | A18 | A20 |
|---|---|---|---|---|---|---|---|---|---|
| S1  | −4.3284E−01 | 3.3314E−01  | 2.8409E−03  | −9.3184E−02 | 1.1940E−01  | −4.5647E−02 | 3.1360E−02  | −1.8849E−03 | 1.1967E−03  |
| S2  | −4.7636E−02 | −2.5367E−04 | −6.6439E−03 | 2.4271E−03  | −1.0201E−03 | 9.0589E−05  | −1.7976E−03 | 1.1288E−03  | −1.5759E−03 |
| S3  | −7.2612E−02 | 9.0758E−03  | 6.7323E−03  | −1.4296E−04 | −7.3096E−04 | −2.9580E−05 | −6.9434E−04 | −2.5954E−04 | 6.4531E−05  |
| S4  | −8.5534E−02 | 1.4010E−02  | 6.0723E−03  | 1.1247E−03  | −1.2120E−03 | 4.8763E−04  | −6.9969E−05 | −2.7304E−04 | 1.8179E−04  |
| S5  | −1.5936E−01 | 3.8646E−02  | −5.5044E−03 | 4.8345E−03  | −3.3616E−03 | 1.9180E−03  | −9.8092E−04 | 4.0415E−04  | −1.3030E−04 |
| S6  | 1.0987E−01  | −1.2849E−02 | 8.0731E−03  | 1.4184E−03  | −2.1862E−03 | 1.3221E−03  | −6.2116E−04 | 2.2292E−04  | −4.3869E−05 |
| S7  | 3.0897E−01  | 6.5267E−02  | −2.7547E−02 | 7.5504E−03  | 4.6117E−03  | −7.1930E−03 | 4.0566E−03  | −1.1216E−03 | 1.0257E−04  |
| S8  | −1.8862E−01 | 1.7706E−01  | −3.8283E−02 | 5.1088E−03  | 3.8995E−03  | −4.9428E−03 | 2.4592E−03  | −5.7883E−04 | 8.4931E−05  |
| S9  | −1.8653E−01 | 2.5100E−01  | −1.9249E−02 | 3.9297E−02  | −1.4035E−02 | 3.1720E−03  | −3.1696E−03 | 7.9638E−03  | −1.6088E−03 |
| S10 | 4.4940E−01  | 4.6565E−02  | 6.8207E−02  | 1.0703E−01  | −7.7054E−02 | 6.1085E−02  | −3.8621E−02 | 2.6546E−02  | 2.7294E−03  |
| S11 | −2.3589E−01 | 1.6131E−01  | 1.3748E−03  | −7.8846E−03 | 5.0285E−03  | −4.5828E−03 | 1.1105E−02  | 4.3843E−03  | 1.0302E−02  |
| S12 | −2.4298E−01 | 2.9287E−01  | −6.8408E−02 | −4.7650E−02 | 1.1083E−01  | −6.3828E−02 | 5.8530E−02  | −2.0417E−02 | 5.2973E−03  |

Figure 10A:
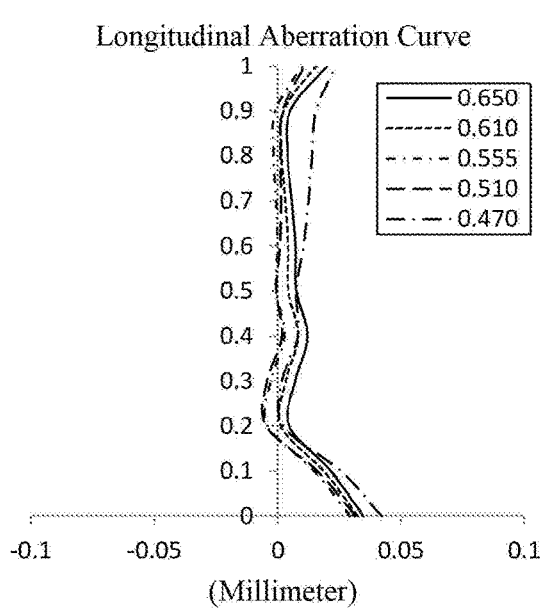
Figure 10B:
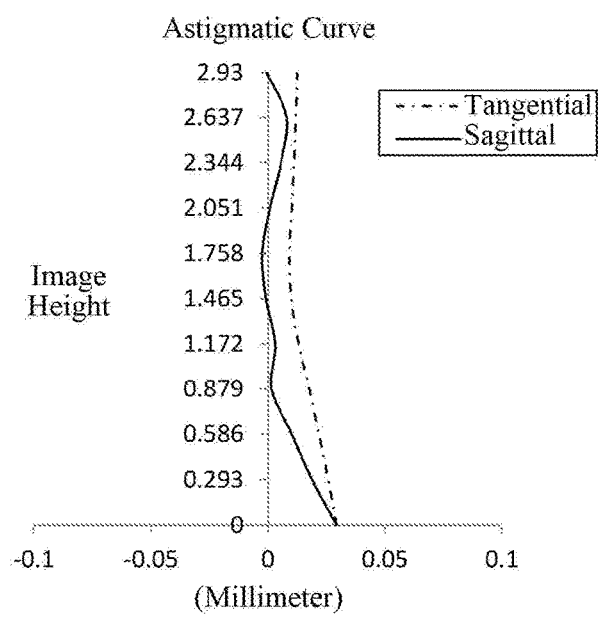

FIG. 10A illustrates a longitudinal aberration curve of the optical imaging lens assembly according to example 5, representing deviations of focal points converged by light of different wavelengths after passing through the lens assembly. FIG. 10B illustrates an astigmatic curve of the optical imaging lens assembly according to example 5, representing a curvature of a tangential plane and a curvature of a sagittal plane. FIG. 10C illustrates a distortion curve of the optical imaging lens assembly according to example 5, representing amounts of distortion corresponding to different image heights. FIG. 10D illustrates a lateral color curve of the optical imaging lens assembly according to example 5, representing deviations of different image heights on an imaging plane after light passes through the lens assembly. It can be seen from FIG. 10A to FIG. 10D that the optical imaging lens assembly provided in example 5 may achieve good image quality.

Example 6

An optical imaging lens assembly according to example 6 of the present disclosure is described below with reference to FIG. 11 to FIG. 12D. FIG. 11 shows a schematic structural view of the optical imaging lens assembly according to example 6 of the present disclosure.

As shown in FIG. 11, the optical imaging lens assembly includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a convex surface. The sixth lens E6 has positive refractive power, an object-side surface S11 thereof is a concave surface, and an image-side surface S12 thereof is a convex surface. The optical filter E7 has an object-side surface S13 and an image-side surface S14. Light from an object sequentially passes through the respective surfaces S to S14 and is finally imaged on the imaging plane S15.

In this example, a total effective focal length f of the optical imaging lens assembly is 6.65 mm, a total length TTL of the optical imaging lens assembly is 6.03 mm, half of a diagonal length ImgH of an effective pixel area on the imaging plane S15 of the optical imaging lens assembly is 2.93 mm, half of a maximal field-of-view Semi-FOV of the optical imaging lens assembly is 23.5°, and an aperture value Fno of the optical imaging lens assembly is 2.10.

Table 11 is a table illustrating basic parameters of the optical imaging lens assembly of example 6, wherein the units for the radius of curvature, the thickness/distance and the focal length are millimeter (mm). Table 12 shows high-order coefficients applicable to each aspheric surface in example 6, wherein the surface shape of each aspheric surface may be defined by the formula (1) given in the above example 1.

TABLE 11

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | −0.7728 | | | | |
| S1  | Aspheric | 1.9900   | 0.9590 | 1.55 | 56.1 | 3.38   | 0.0000  |
| S2  | Aspheric | 16.8024  | 0.0300 |      |      |        | 0.0000  |
| S3  | Aspheric | 4.6365   | 0.2385 | 1.68 | 19.2 | −7.07  | 0.0000  |
| S4  | Aspheric | 2.3765   | 0.6433 |      |      |        | 0.0000  |
| S5  | Aspheric | 3.0383   | 0.3589 | 1.54 | 55.7 | 53.29  | −0.3271 |
| S6  | Aspheric | 15.8957  | 0.4674 |      |      |        | 0.0000  |
| S7  | Aspheric | −2.0517  | 0.2385 | 1.67 | 20.4 | −25.88 | 0.0000  |
| S8  | Aspheric | −17.0382 | 0.7600 |      |      |        | 0.0000  |
| S9  | Aspheric | −2.3061  | 0.2320 | 1.54 | 55.7 | −4.80  | 0.0000  |
| S10 | Aspheric | −5.3116  | 0.3872 |      |      |        | 0.0000  |

TABLE 11-continued

| Surface number | Surface type | Radius of curvature | Thickness/ Distance | Material Refractive index | Abbe number | Focal length | Conic coefficient |
|---|---|---|---|---|---|---|---|
| S11 | Aspheric | −17.4078 | 0.8952 | 1.68 | 19.2 | 22.66 | 0.0000 |
| S12 | Aspheric | −4.4952 | 0.0693 | | | | 0.0000 |
| S13 | Spherical | Infinite | 0.2100 | 1.52 | 64.2 | | |
| S14 | Spherical | Infinite | 0.5407 | | | | |
| S15 | Spherical | Infinite | | | | | |

TABLE 12

| Surface number | A4 | A6 | A8 | A10 | A12 | A14 | A16 | A18 | A20 |
|---|---|---|---|---|---|---|---|---|---|
| S1 | 8.8246E−02 | −1.9100E−02 | 2.6502E−03 | 1.3009E−04 | −1.1334E−04 | 2.6052E−05 | −1.1116E−04 | 1.0066E−04 | −6.1559E−05 |
| S2 | −4.6003E−02 | 9.2688E−04 | −6.3542E−03 | 2.3183E−03 | −6.3082E−04 | −5.0655E−04 | −2.4309E−03 | 1.5797E−03 | −1.9699E−03 |
| S3 | −7.4743E−02 | 7.9262E−03 | 6.0589E−03 | −6.7921E−04 | −1.0609E−03 | −2.4050E−04 | −7.4884E−04 | −2.2798E−04 | 5.4068E−05 |
| S4 | −8.9492E−02 | 1.1962E−02 | 5.0529E−03 | 9.4099E−04 | −1.3066E−03 | 4.7118E−04 | −1.3156E−04 | −2.0357E−04 | 1.7299E−04 |
| S5 | −1.6445E−01 | 3.7591E−02 | −6.2857E−03 | 4.5519E−03 | −2.8147E−03 | 1.5533E−03 | −7.9735E−04 | 3.3430E−04 | −1.0979E−04 |
| S6 | 1.0692E−01 | −1.5153E−02 | 7.2907E−03 | 2.0324E−03 | −2.1849E−03 | 1.1443E−03 | −4.5145E−04 | 1.1720E−04 | −3.5767E−07 |
| S7 | 3.0700E−01 | 6.5168E−02 | −2.8179E−02 | 7.0007E−03 | 4.9554E−03 | −6.3276E−03 | 3.0396E−03 | −6.6644E−04 | 3.3773E−06 |
| S8 | −1.9301E−01 | 1.7538E−01 | −3.8106E−02 | 4.2147E−03 | 4.2049E−03 | −4.0040E−03 | 1.5785E−03 | −2.6745E−04 | 2.0589E−05 |
| S9 | −1.3918E−01 | 2.6522E−01 | −2.7048E−02 | 3.2253E−02 | −6.4852E−03 | 3.4962E−03 | −5.4940E−03 | 7.2769E−03 | −1.3191E−03 |
| S10 | 6.0821E−01 | 3.9892E−02 | 4.3883E−02 | 1.0902E−01 | −6.9074E−02 | 6.5043E−02 | −4.1413E−02 | 2.5284E−02 | 8.0653E−04 |
| S11 | −1.9295E−01 | 1.1351E−01 | −3.3720E−02 | 9.3059E−03 | 5.0016E−03 | −7.1377E−03 | 8.6698E−03 | 2.3993E−03 | 1.0382E−02 |
| S12 | −2.6894E−01 | 2.4655E−01 | −7.0538E−02 | −1.2656E−02 | 8.2379E−02 | −6.1135E−02 | 6.6984E−02 | −3.5281E−02 | 2.0884E−02 |

Figure 12A:
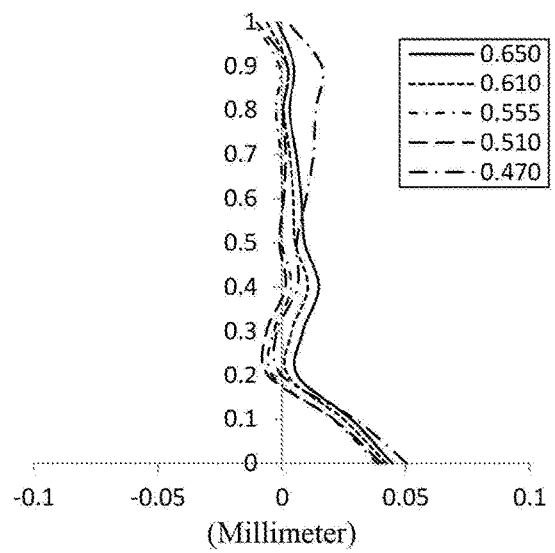
FIGS. 12A to 12D illustrate a longitudinal aberration curve, an astigmatic curve, a distortion curve, and a lateral color curve of the optical imaging lens assembly of the example 6, respectively.
Figure 12B:
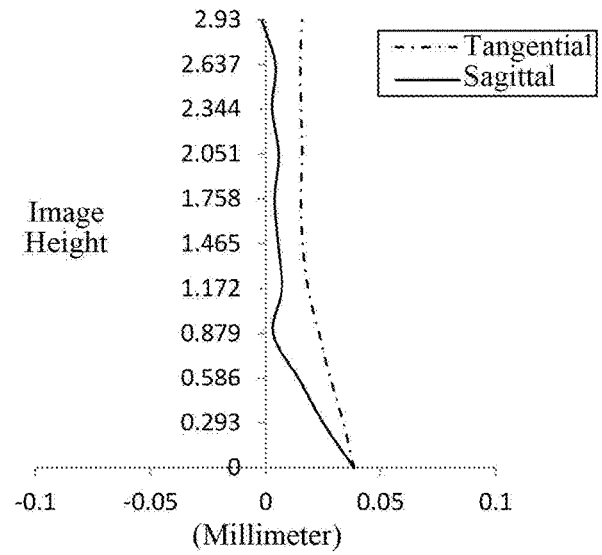
Figure 12C:
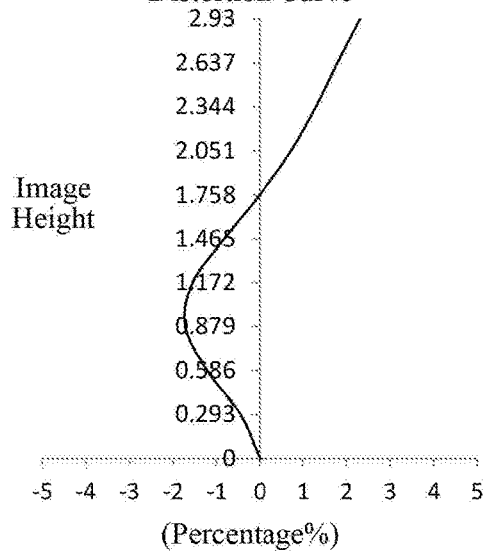
Figure 12D:
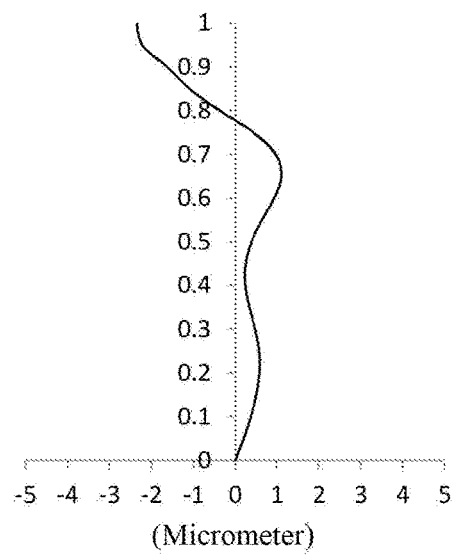

FIG. 12A illustrates a longitudinal aberration curve of the optical imaging lens assembly according to example 6, representing deviations of focal points converged by light of different wavelengths after passing through the lens assembly. FIG. 12B illustrates an astigmatic curve of the optical imaging lens assembly according to example 6, representing a curvature of a tangential plane and a curvature of a sagittal plane. FIG. 12C illustrates a distortion curve of the optical imaging lens assembly according to example 6, representing amounts of distortion corresponding to different image heights. FIG. 12D illustrates a lateral color curve of the optical imaging lens assembly according to example 6, representing deviations of different image heights on an imaging plane after light passes through the lens assembly. It can be seen from FIG. 12A to FIG. 12D that the optical imaging lens assembly provided in example 6 may achieve good image quality.

Example 7

Figure 13:
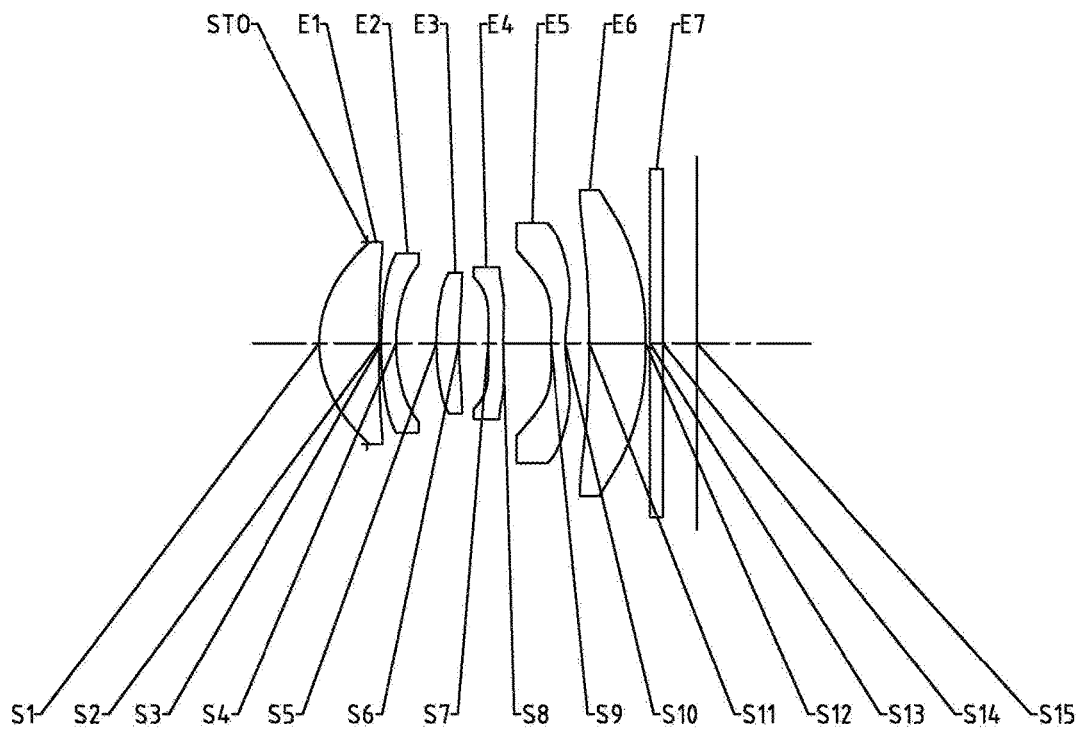
FIG. 13 illustrates a schematic structural view of an optical imaging lens assembly according to example 7 of the present disclosure.
Figure 14A:
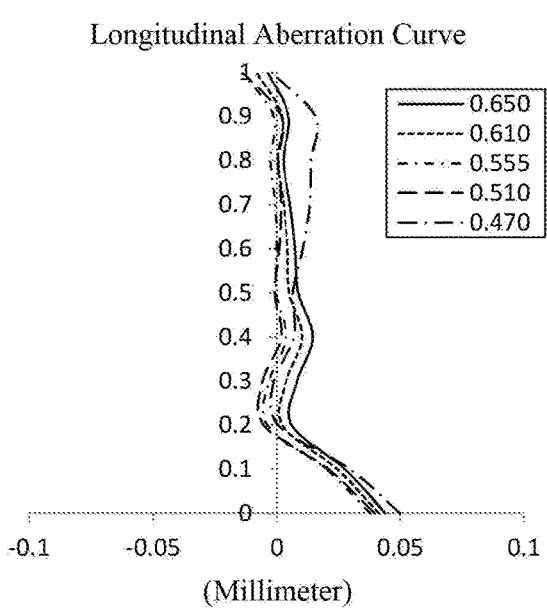
FIGS. 14A to 14D illustrate a longitudinal aberration curve, an astigmatic curve, a distortion curve, and a lateral color curve of the optical imaging lens assembly of the example 7, respectively.
Figure 14B:
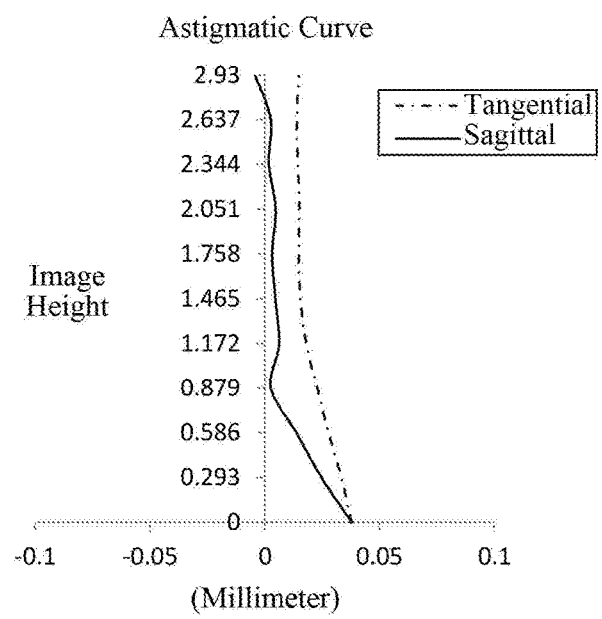
Figure 14C:
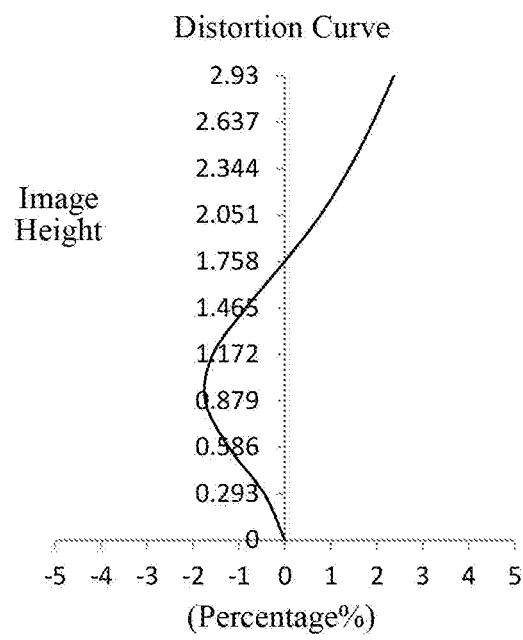
Figure 14D:
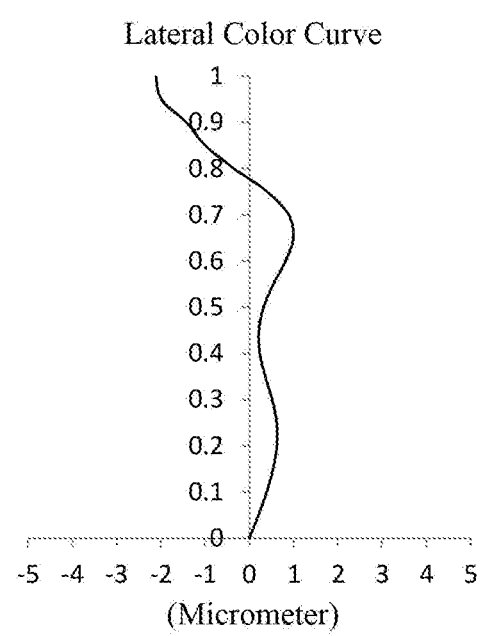

An optical imaging lens assembly according to example 7 of the present disclosure is described below with reference to FIG. 13 to FIG. 14D. FIG. 13 shows a schematic structural view of the optical imaging lens assembly according to example 7 of the present disclosure.

As shown in FIG. 13, the optical imaging lens assembly includes a stop STO, a first lens E1, a second lens E2, a third lens E3, a fourth lens E4, a fifth lens E5, a sixth lens E6, an optical filter E7 and an imaging plane S15, which are sequentially arranged from an object side to an image side.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has negative refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a convex surface. The sixth lens E6 has positive refractive power, an object-side surface S11 thereof is a concave surface, and an image-side surface S12 thereof is a convex surface. The optical filter E7 has an object-side surface S13 and an image-side surface S14. Light from an object sequentially passes through the respective surfaces S1 to S14 and is finally imaged on the imaging plane S15.

In this example, a total effective focal length f of the optical imaging lens assembly is 6.65 mm, a total length TTL of the optical imaging lens assembly is 6.03 mm, half of a diagonal length ImgH of an effective pixel area on the imaging plane S15 of the optical imaging lens assembly is 2.93 mm, half of a maximal field-of-view Semi-FOV of the optical imaging lens assembly is 23.5°, and an aperture value Fno of the optical imaging lens assembly is 2.10.

Table 13 is a table illustrating basic parameters of the optical imaging lens assembly of example 7, wherein the units for the radius of curvature, the thickness/distance and the focal length are millimeter (mm). Table 14 shows high-order coefficients applicable to each aspheric surface in example 7, wherein the surface shape of each aspheric surface may be defined by the formula (1) given in the above example 1.

TABLE 13

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7653 | | | | |
| S1 | Aspheric | 1.9987 | 0.9567 | 1.55 | 56.1 | 3.38 | 0.0000 |
| S2 | Aspheric | 18.4089 | 0.0300 | | | | 0.0000 |
| S3 | Aspheric | 4.6703 | 0.2385 | 1.68 | 19.2 | −7.12 | 0.0000 |
| S4 | Aspheric | 2.3891 | 0.6426 | | | | 0.0000 |
| S5 | Aspheric | 3.0618 | 0.3602 | 1.54 | 55.7 | 56.39 | −0.2716 |
| S6 | Aspheric | 16.2354 | 0.4661 | | | | 0.0000 |
| S7 | Aspheric | −2.0503 | 0.2385 | 1.67 | 20.4 | −24.81 | 0.0000 |
| S8 | Aspheric | −18.0443 | 0.7640 | | | | 0.0000 |
| S9 | Aspheric | −2.3345 | 0.2320 | 1.54 | 55.7 | −4.84 | 0.0000 |
| S10 | Aspheric | −5.4750 | 0.3833 | | | | 0.0000 |
| S11 | Aspheric | −20.8230 | 0.8982 | 1.68 | 19.2 | 23.41 | 0.0000 |
| S12 | Aspheric | −4.6477 | 0.0693 | | | | 0.0000 |
| S13 | Spherical | Infinite | 0.2100 | 1.52 | 64.2 | | |
| S14 | Spherical | Infinite | 0.5407 | | | | |
| S15 | Spherical | Infinite | | | | | |

TABLE 14

| Surface number | A4 | A6 | A8 | A10 | A12 | A14 | A16 | A18 | A20 |
|---|---|---|---|---|---|---|---|---|---|
| S1 | 9.0648E−02 | −1.9786E−02 | 2.8985E−03 | 2.6671E−05 | −5.3213E−05 | −2.5253E−05 | −6.0523E−05 | 7.3001E−05 | −5.6380E−05 |
| S2 | −4.3095E−02 | 1.4088E−03 | −7.3425E−03 | 2.2729E−03 | −4.2769E−05 | −7.9551E−04 | −2.5279E−03 | 1.7352E−03 | −1.9782E−03 |
| S3 | −7.6166E−02 | 8.1624E−03 | 5.7590E−03 | −7.1554E−04 | −1.0097E−03 | −2.7737E−04 | −6.8584E−04 | −1.6650E−04 | 5.1117E−05 |
| S4 | −8.9594E−02 | 1.1399E−02 | 4.8761E−03 | 1.1237E−03 | −1.4107E−03 | 5.0743E−04 | −1.3637E−04 | −1.9130E−04 | 1.7077E−04 |
| S5 | −1.6535E−01 | 3.7257E−02 | −6.4145E−03 | 4.5401E−03 | −2.7641E−03 | 1.5352E−03 | −7.9954E−04 | 3.4047E−04 | −1.1213E−04 |
| S6 | 1.0592E−01 | −1.5643E−02 | 7.4093E−03 | 2.0160E−03 | −2.1337E−03 | 1.1159E−03 | −4.4012E−04 | 1.1279E−04 | 1.5062E−06 |
| S7 | 3.0695E−01 | 6.5253E−02 | −2.8073E−02 | 6.9786E−03 | 5.0333E−03 | −6.4009E−03 | 3.1149E−03 | −7.2233E−04 | 2.3521E−05 |
| S8 | −1.9308E−01 | 1.7530E−01 | −3.7780E−02 | 4.2232E−03 | 4.1111E−03 | −3.8658E−03 | 1.5048E−03 | −2.5913E−04 | 2.4902E−05 |
| S9 | −1.3124E−01 | 2.6949E−01 | −2.7176E−02 | 3.0331E−02 | −5.5025E−03 | 3.3132E−03 | −5.4488E−03 | 7.1828E−03 | −1.3673E−03 |
| S10 | 6.3360E−01 | 3.9826E−02 | 4.2527E−02 | 1.0945E−01 | −6.9566E−02 | 6.5558E−02 | −4.1232E−02 | 2.4954E−02 | 9.5339E−04 |
| S11 | −1.9674E−01 | 9.9227E−02 | −3.2964E−02 | 1.2340E−02 | 3.0647E−03 | −6.1699E−03 | 8.7449E−03 | 1.6306E−03 | 1.1277E−02 |
| S12 | −2.7907E−01 | 2.2491E−01 | −5.7271E−02 | −9.2166E−03 | 7.6492E−02 | −5.7346E−02 | 6.6558E−02 | −3.7218E−02 | 2.4296E−02 | light of different wavelengths after passing through the lens assembly. FIG. 14B illustrates an astigmatic curve of the optical imaging lens assembly according to example 7, representing a curvature of a tangential plane and a curvature of a sagittal plane. FIG. 14C illustrates a distortion curve of the optical imaging lens assembly according to example 7, representing amounts of distortion corresponding to different image heights. FIG. 14D illustrates a lateral color curve of the optical imaging lens assembly according to example 7, representing deviations of different image heights on an imaging plane after light passes through the lens assembly. It can be seen from FIG. 14A to FIG. 14D that the optical imaging lens assembly provided in example 7 may achieve good image quality.

In view of the above, examples 1 to 7 respectively satisfy the relationship shown in Table 15.

TABLE 15

| Condition/Example | 1 | 2 | 3 | 4 | 5 | 6 | 7 |
|---|---|---|---|---|---|---|---|
| TTL/f | 0.91 | 0.92 | 0.91 | 0.91 | 0.91 | 0.91 | 0.91 |
| CT1/(CT2 + CT3) | 1.40 | 1.41 | 1.44 | 1.52 | 1.58 | 1.61 | 1.60 |
| (R3 + R4)/(R3 − R4) | 3.15 | 3.20 | 3.14 | 3.17 | 3.16 | 3.10 | 3.09 |
| R6/R5 | 4.74 | 5.18 | 4.75 | 5.57 | 5.57 | 5.23 | 5.30 |
| R8/(R7*3) | 1.88 | 2.07 | 2.29 | 2.15 | 2.52 | 2.77 | 2.93 |
| R10/R9 | 2.26 | 2.27 | 2.21 | 2.10 | 1.92 | 2.30 | 2.35 |
| R11/R12 | 1.95 | 2.05 | 1.97 | 2.02 | 2.07 | 3.87 | 4.48 |
| T23/CT3 | 1.50 | 1.57 | 1.58 | 1.72 | 1.81 | 1.79 | 1.78 |
| CT6/T56 | 1.96 | 1.93 | 1.95 | 2.16 | 2.01 | 2.31 | 2.34 |
| R2/f1 | 2.81 | 2.87 | 3.14 | 4.21 | 4.56 | 4.97 | 5.45 |
| f2/R3 | −1.45 | −1.53 | −1.47 | −1.54 | −1.55 | −1.52 | −1.52 |
| f5/R9 | 2.32 | 2.18 | 2.26 | 2.16 | 2.18 | 2.08 | 2.07 |

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, sequentially from an object side to an image side of the optical imaging lens assembly along an optical axis, comprising:
    a first lens having positive refractive power;
    a second lens having negative refractive power with a convex object-side surface and a concave image-side surface;
    a third lens having positive refractive power;
    a fourth lens having negative refractive power;
    a fifth lens having negative refractive power with a concave object-side surface and a convex image-side surface; and
    a sixth lens having refractive power with a concave object-side surface and a convex image-side surface,
    wherein TTL/f<1,
    where TTL is a distance along the optical axis from an object-side surface of the first lens to an imaging plane of the optical imaging lens assembly, and f is a total effective focal length of the optical imaging lens assembly; and
    wherein 2.0<f5/R9<2.5,
    where f5 is an effective focal length of the fifth lens, and R9 is a radius of curvature of the concave object-side surface of the fifth lens.

2. The optical imaging lens assembly according to claim 1, wherein 1.0<CT1/(CT2+CT3)<2.0,
    where CT1 is a center thickness of the first lens along the optical axis, CT2 is a center thickness of the second lens along the optical axis, and CT3 is a center thickness of the third lens along the optical axis.

3. The optical imaging lens assembly according to claim 1, wherein −2.0<f2/R3<−1.0,
    where f2 is an effective focal length of the second lens, and R3 is a radius of curvature of the object-side surface of the second lens.

4. The optical imaging lens assembly according to claim 3, wherein 3.0<(R3+R4)/(R3−R4)<3.5,
    where R3 is the radius of curvature of the object-side surface of the second lens, and R4 is a radius of curvature of the image-side surface of the second lens.

5. The optical imaging lens assembly according to claim 1, wherein 4.5<R6/R5<6.0,
    where R5 is a radius of curvature of an object-side surface of the third lens, and R6 is a radius of curvature of an image-side surface of the third lens.

6. The optical imaging lens assembly according to claim 1, wherein 1.5<R8/(R7*3)<3.0,
    where R7 is a radius of curvature of an object-side surface of the fourth lens, and R8 is a radius of curvature of an image-side surface of the fourth lens.

7. The optical imaging lens assembly according to claim 1, wherein 1.5<R10/R9<2.5,
    where R9 is the radius of curvature of the object-side surface of the fifth lens, and R10 is the radius of curvature of the image-side surface of the fifth lens.

8. The optical imaging lens assembly according to claim 1, wherein 1.5<R11/R12<4.5,
    where R11 is a radius of curvature of the object-side surface of the sixth lens, and R12 is a radius of curvature of the image-side surface of the sixth lens.

9. The optical imaging lens assembly according to claim 1, wherein 2.5<R2/f1<5.5,
    where R2 is a radius of curvature of an image-side surface of the first lens, and f1 is an effective focal length of the first lens.

10. The optical imaging lens assembly according to claim 1, wherein 1.5≤T23/CT3<4.5,
    where T23 is a spaced interval between the second lens and the third lens along the optical axis, and CT3 is a center thickness of the third lens along the optical axis.

11. The optical imaging lens assembly according to claim 1, wherein 1.5<CT6/T56<2.5,
    where CT6 is a center thickness of the sixth lens along the optical axis, and T56 is a spaced interval between the fifth lens and the sixth lens along the optical axis.

12. An optical imaging lens assembly, sequentially from an object side to an image side of the optical imaging lens assembly along an optical axis, comprising:
    a first lens having positive refractive power;
    a second lens having negative refractive power with a convex object-side surface and a concave image-side surface;
    a third lens having positive refractive power;
    a fourth lens having negative refractive power;
    a fifth lens having negative refractive power with a concave object-side surface and a convex image-side surface; and
    a sixth lens having refractive power with a concave object-side surface and a convex image-side surface,
    wherein 3.0<(R3+R4)/(R3−R4)<3.5,
    where R3 is a radius of curvature of the object-side surface of the second lens, and R4 is a radius of curvature of the image-side surface of the second lens; and
    wherein 2.0<f5/R9<2.5,
    where f5 is an effective focal length of the fifth lens, and R9 is a radius of curvature of the concave object-side surface of the fifth lens.

13. The optical imaging lens assembly according to claim 12, wherein 1.0<CT1/(CT2+CT3)<2.0,
    where CT1 is a center thickness of the first lens along the optical axis, CT2 is a center thickness of the second lens along the optical axis, and CT3 is a center thickness of the third lens along the optical axis.

14. The optical imaging lens assembly according to claim 12, wherein 1.5<R8/(R7*3)<3.0,
    where R7 is a radius of curvature of an object-side surface of the fourth lens, and R8 is a radius of curvature of an image-side surface of the fourth lens.

15. The optical imaging lens assembly according to claim 12, wherein 1.5≤T23/CT3<4.5, where T23 is a spaced interval between the second lens and the third lens along the optical axis, and CT3 is a center thickness of the third lens along the optical axis.

16. The optical imaging lens assembly according to claim 12, wherein $1.5 < CT6/T56 < 2.5$,
where CT6 is a center thickness of the sixth lens along the optical axis, and T56 is a spaced interval between the fifth lens and the sixth lens along the optical axis.

17. The optical imaging lens assembly according to claim 12, wherein $2.5 < R2/f1 < 5.5$,
where R2 is a radius of curvature of an image-side surface of the first lens, and f1 is an effective focal length of the first lens.

18. The optical imaging lens assembly according to claim 12, wherein $-2.0 < f2/R3 < -1.0$,
where f2 is an effective focal length of the second lens, and R3 is the radius of curvature of the object-side surface of the second lens.

* * * * *